(12) United States Patent
Benson et al.

(10) Patent No.: US 11,640,555 B2
(45) Date of Patent: May 2, 2023

(54) MACHINE AND DEEP LEARNING PROCESS MODELING OF PERFORMANCE AND BEHAVIORAL DATA

(71) Applicant: Aptology, Inc., San Francisco, CA (US)

(72) Inventors: Bradford Ames Benson, San Francisco, CA (US); Phil Cullen, San Rafael, CA (US)

(73) Assignee: Aptology, Inc., San Francisco, CA (US)

( * ) Notice: Subject to any disclaimer, the term of this patent is extended or adjusted under 35 U.S.C. 154(b) by 498 days.

(21) Appl. No.: 16/724,251

(22) Filed: Dec. 21, 2019

(65) Prior Publication Data
US 2021/0192387 A1    Jun. 24, 2021

(51) Int. Cl.
*G06N 20/00* (2019.01)
*G06N 5/04* (2023.01)
*G06F 17/18* (2006.01)

(52) U.S. Cl.
CPC ............. *G06N 20/00* (2019.01); *G06F 17/18* (2013.01); *G06N 5/04* (2013.01)

(58) Field of Classification Search
CPC ........ G06F 17/18; G06F 17/50; G06F 17/509; G05B 23/024; G05B 23/02; G05B 9/02; G06Q 10/06; G06Q 10/047; B61L 27/0016; B61L 27/0022; B61L 27/002; B61L 2205/04; G06T 17/00; G60T 19/00
USPC ........................................................ 706/12
See application file for complete search history.

(56) References Cited

U.S. PATENT DOCUMENTS

| | | | | |
|---|---|---|---|---|
| 6,606,615 B1 * | 8/2003 | Jennings | ................ | G06Q 10/06 706/45 |
| 6,792,399 B1 * | 9/2004 | Phillips | .................. | G06Q 40/04 705/37 |
| 7,464,046 B2 * | 12/2008 | Wilson | ............... | G06Q 30/0601 705/7.42 |
| 2008/0294627 A1 * | 11/2008 | Wadsworth | ............ | G06Q 10/06 707/999.005 |

(Continued)

FOREIGN PATENT DOCUMENTS

WO    2021127660 A2    6/2021

OTHER PUBLICATIONS

Young, Lee, Notification of Transmittal of the International Search Report and the Written Opinion of the International Searching Authority, or the Declaration, dated Jun. 3, 2021 for International Application No. PCT/US2020/066492.

*Primary Examiner* — William D Titcomb
(74) *Attorney, Agent, or Firm* — Kokka & Backus, PC

(57) ABSTRACT

Techniques for machine and deep learning process modeling of performance and behavioral data are described, including receiving objective performance data, including an induction document, and raw performance data, validating the raw performance data, determining whether incumbent data is sufficient to build a model, building a model to generate an output performance dataset, evaluating a behavioral dataset generated using behavioral attributes determined from a survey, identifying a candidate file using the model, the model being identified as a model candidate, and evaluating the model candidate against one or more other model candidates using one or more exit criteria to determine whether the model candidate, relative to the one or more other model candidates, is used to identify a release candidate.

20 Claims, 11 Drawing Sheets

(56) References Cited

U.S. PATENT DOCUMENTS

| | | | | |
|---|---|---|---|---|
| 2010/0293451 A1* | 11/2010 | Carus | ............... | G06N 20/00 |
| | | | | 715/256 |
| 2015/0339572 A1* | 11/2015 | Achin | ............... | G06N 20/00 |
| | | | | 706/46 |
| 2018/0046926 A1* | 2/2018 | Achin | ............... | G06N 20/20 |
| 2018/0060738 A1* | 3/2018 | Achin | ............... | G06N 20/00 |
| 2018/0060744 A1* | 3/2018 | Achin | ............... | G06N 5/04 |
| 2021/0192387 A1* | 6/2021 | Benson | ............... | G06N 20/10 |

\* cited by examiner

MACHINE AND DEEP LEARNING PROCESS MODELING OF PERFORMANCE AND BEHAVIORAL DATA

FIELD

The present invention relates generally to computer science, data science, behavioral science, and data analytics. More specifically, techniques for machine and deep learning process modeling of performance and behavioral data are described.

BACKGROUND

Improving the performance of organizations in various industries is a continuous time and cost-intensive challenge. Organizations are constantly seeking to improve performance while maintaining organizational management and behavior costs low. Using conventional organizational management technologies, organizations traditionally experience low rates of success or achievement (e.g., sales organizations within large scale enterprises may experience success rates (i.e., engaging or contracting with new customers as measured against a repeatable time period such as a calendar or fiscal quarter or year) among sales staff of 30-40% while bearing an enormous personnel cost for those not responsible for this success rate. Regardless of technical sector or industrial category, organizations ranging from for-profit corporations to non-profit entities to governmental agencies are facing difficult and expensive technological problems using conventional software to improve organizational performance, despite having access to ever-increasing large amounts of data generated from the use of various computing systems and devices. Generally, the computing task of evaluating a large pool of data to identify and develop solutions to data-centric problems relies upon the use of conventional solutions that are typically inflexible, expensive, difficult to use and implement, and ineffective due to low solution rates, often relying upon rules-based logic in software. Tremendous amounts of data generated by these organizations are often overlooked or under-utilized.

Conventional techniques in data science and analytics to aid computer-based logic particularly in the identification, selection, and recommendation of data parsed from a larger set of data is constantly evolving, but there is an increasing amount of technological investment and competition. However, conventional techniques also typically rely upon extremely expensive hardware and software to parse through large amounts of data to identify desired subsets of data, frequently involving the use of human-based operators and programmers who manually adjust criteria or rules governing selection, which is highly inefficient and prohibits processing of a large pool of data. Other conventional techniques rely upon the use of entire programs or software that largely consist of rules that are rigidly applied to datasets, but which typically generate inefficient and/or inaccurate results. Using conventional software programs and applications to identify and select solutions to a given data problem while taking into account numerous factors beyond those capable of being efficiently or timely handled by humans, is problematic due to inflexible technologies such as rules-based logic and manual intervention, which forces the occurrence of low effectiveness rates due to errors such as selecting mismatched data candidates as potential solutions to a given problem or selecting marginal data candidates having a low percentage rate of success in solving a given problem. Further, typical conventional solutions do not utilize data from prior processing and thus miss an enormous opportunity to improve selection logic and processes of data that identify solutions to a given technical, organizational, or data-based problem. Thus, conventional techniques such as these are problematic and deny efficiency in both time and cost. Improvement and flexibility in processing of multi-variable complex data problems are needed.

Thus, what is needed is a solution for processing organizational data to solve organizational problems without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1A:
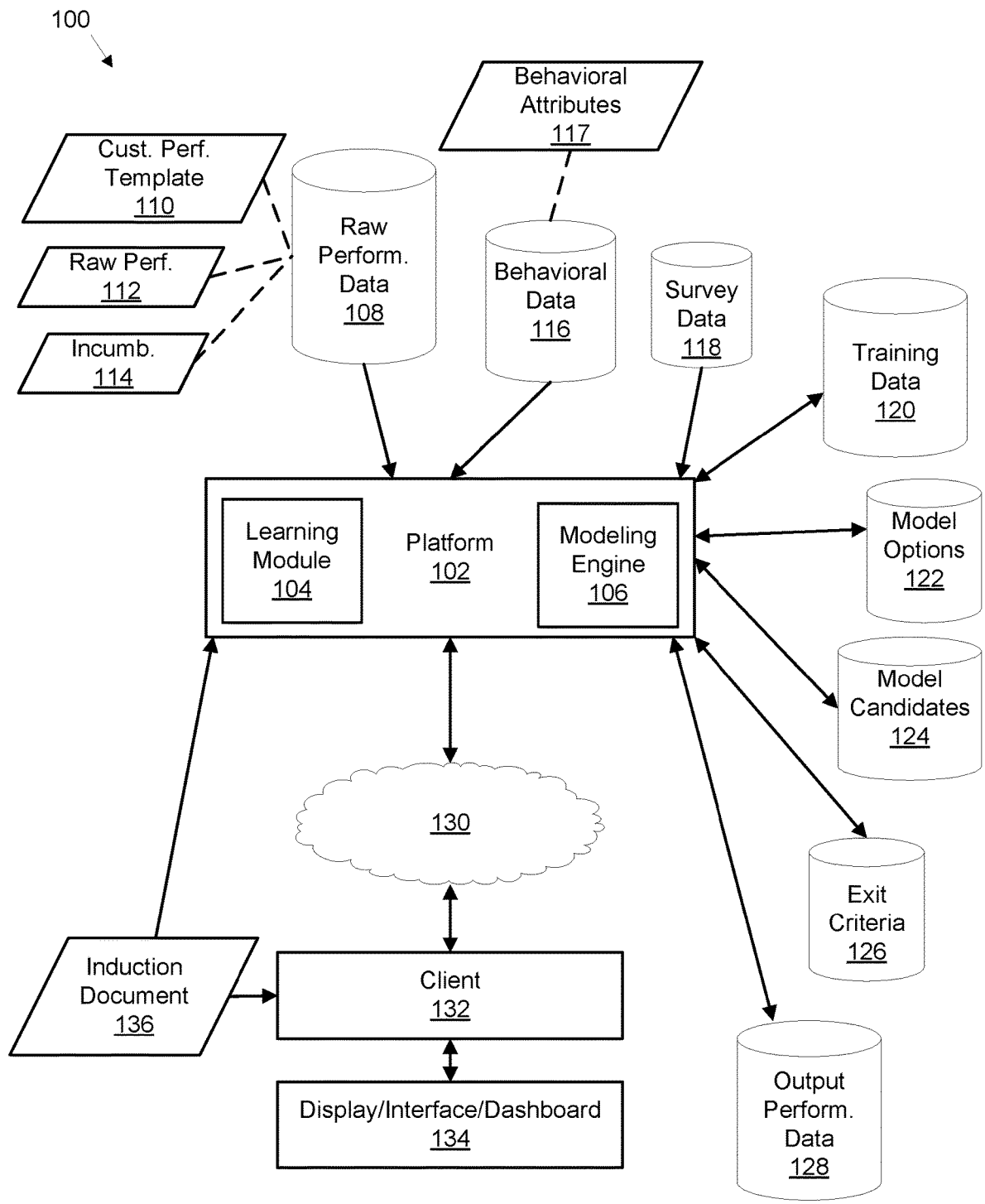
FIG. 1A illustrates an exemplary system for machine and deep learning process modeling of performance and behavioral data.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas such as SQL, MySQL, NoSQL, DynamoDB™ or others, such as those developed by proprietary and open source providers like Amazon® Web Services, Inc. of Seattle, Wash., Microsoft®, Oracle®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. As described herein, disclosed processes implemented as software may be programmed using Java®, JavaScript®, Scala, Perl, Python™, XML, HTML, and other data formats and programs, without limitation. As used in this Detailed Description, references to layers of an application architecture (e.g., application layer or data layer) may refer to a stacked layer application architecture such as the Open Systems Interconnect (OSI) model or others.

Figure 2:
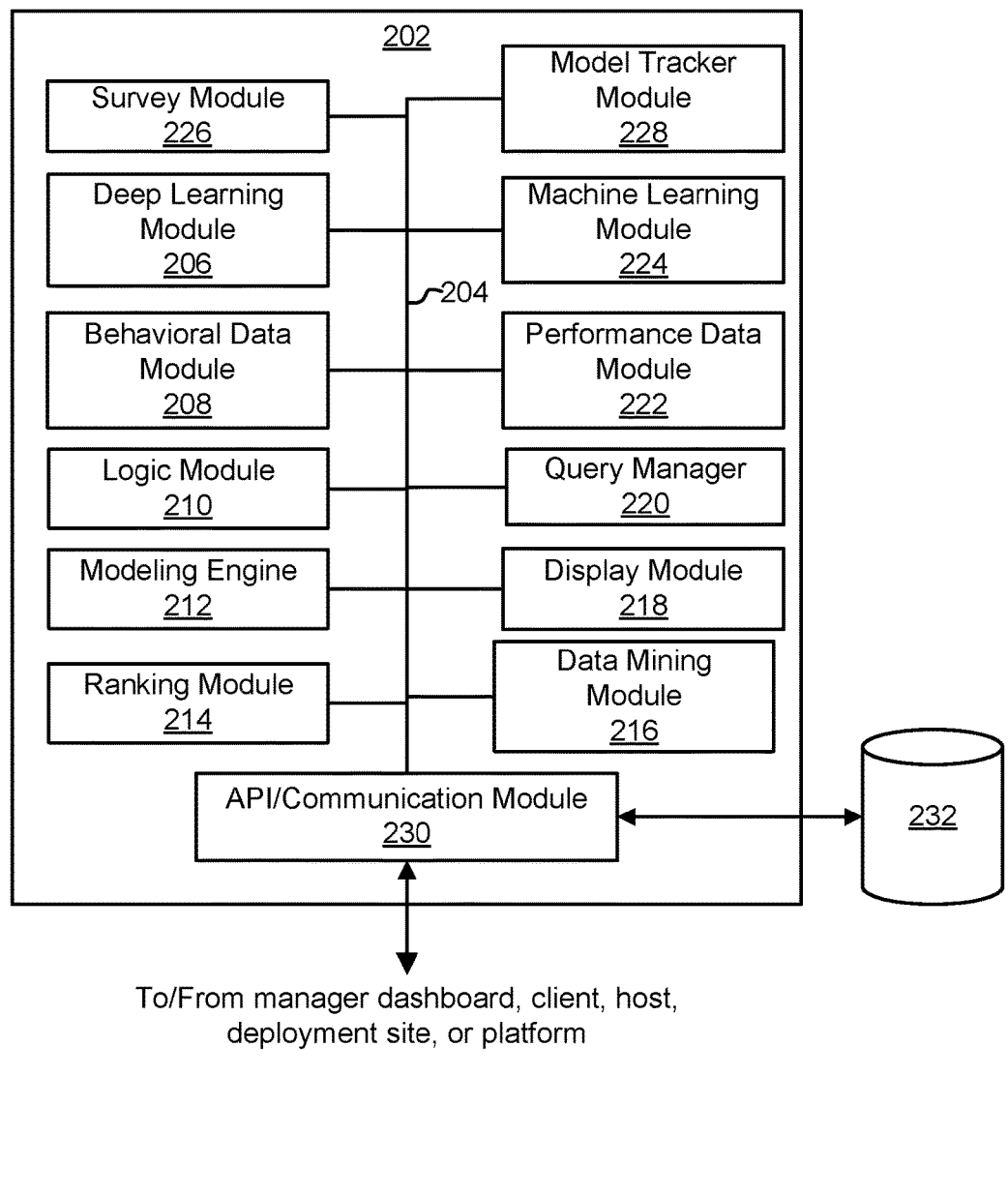
FIG. 2 illustrates an exemplary application architecture for machine and deep learning process modeling of performance and behavioral data.

FIG. 1A illustrates an exemplary system for machine and deep learning process modeling of performance and behavioral data. Here, system 100 includes platform 102 (including learning module 104 and modeling engine 106 (among others, as shown in FIG. 2), raw performance data 108, customized performance template 110, raw performance data 112, incumbent data 114, behavioral data 116, survey data 118, training data 120, model options data 122, model candidates data 124, exit criteria data 126, output performance data 128, network 130, client 132, display/interface/dashboard 134, and induction document 136. In some examples, elements 102-136 of system 100 may be varied in number, configuration, topology, function, and/or structure without limitation or restriction to any particular implementation. Further, elements 102-136 of system 100, as described in greater detail below, are provided for purposes of illustration and example and are not intended to be limiting to a specific implementation.

Here, system 100 and elements 102-136 may be implemented as software, hardware, circuitry (e.g., application-specific or otherwise), or a combination thereof, without limitation or restriction to any particular implementation. As shown, platform 102 may be implemented as a software platform that includes learning module 104, which may provide data processing capabilities using one or more deep learning or machine learning algorithms that are configured to generate predictive models that are configured to be trained to identify specific data (e.g., candidate data (not shown) such as output performance data 128), as described herein. Here, induction document 136 may be transferred from client 132 over data network 130 to platform 102 for processing as raw performance data 108. As used herein, "raw performance data" may refer to data input to platform 102 using, for example, an induction document. Raw performance data may be composed of individual files, records, or datasets that include, in some examples, an identifier to link performance data to survey data, categorical data (e.g., role, region, or others, without limitation or restriction), start date, tenure, key performance indicators (hereafter referred to as "KPIs"), calculations for performance KPIs, or other attributes.

In some examples, data mining protocols such as CRISP-DM may be used to process (e.g., receive, interpret, encode, decode, or others, without limitation or restriction) induction document 136 for platform 102 to use in connection with other elements of system 100. In other words, induction document 136 may, in some examples, include raw performance data 112, behavioral data 116, and/or incumbent data 114 that is determined (i.e., interpreted, resolved, or yielded from the encapsulating induction document 136) by using CRISP or other data mining protocols. When received by platform 102, raw induction document 136 may be processed using customized performance template 110 in order to identify raw performance data 108 when evaluated against behavioral data 116 and/or incumbent data 114. In some examples, incumbent data 114 may also be force ranked (e.g., using techniques such as vitality curves, stack ranking, or others, without limitation or restriction) prior to being used by a model generated by platform 102. Here, custom or customized (used herein interchangeably) performance template 110 may be a template that is used to identify desired fields, rows, columns, or other structures, attributes, or contextual elements of raw performance data 112. Customized performance template 110 may be configured to be used to process induction document 136, which may input raw performance data 112 in any type of data format, structure, or schema, without limitation or restriction.

As described herein, learning module 104 may be configured to process raw performance data 108, behavioral data 116, and/or survey data 118 and, working with modeling engine 106, may be trained using training data 120 to develop a data model that is configured to identify data patterns, behavior, solutions, or other result. As an example, platform 102 may be configured to train a model (not shown) using deep learning module 104 and modeling engine 106 to identify candidates that meet or exceed attribute thresholds that are determined by evaluating behavioral attributes identified in behavioral data 116 and/or survey data 118. Behavioral data 116, in some examples, may include different types of data such as differentiators (e.g., data that is used to determine predictive outputs of a model) and baseline traits (e.g., attributes that are determined to be fundamental or base to a preexisting population of other records (e.g., other candidates, employees, or the like) and which are used for comparative analysis purposes of a given candidate when run through a predictive model generated by platform 102). Further, survey data 188 may include data gathered from surveys or "behavioral assessments" that are used to identify key performance indicators, behavioral attributes, and other aspects of data to be used when running a model against raw performance data 108.

As referenced above, input data may be objective performance data (i.e., "raw performance data") that includes raw performance datasets 112 and incumbent data 114 that, using customized performance template 110, may be stored as raw performance data 108, which may be further validated, as discussed in greater detail below in connection with FIGS. 4A-4B. In some examples, a survey may be used to gather behavioral data regarding an employment candidate, for example, which may provide data that identifies one or more attributes for use by a model generated by platform 102. Incumbent data may be gathered from existing personnel, for example, using a survey as well. Using incumbent data gathered from surveys, predictive analysis of incoming candidates (i.e., raw performance data 108) may be used to determine if a given file, record, candidate, or the like is a suitable match, high match, "great" match, low match, mismatch, or non-match. In other examples, behavioral data 116 and survey data 118 may be gathered differently and is not limited to the techniques described herein.

Referring back to FIG. 1A, raw performance data 108 (which may include, one or more individual records for raw performance 112, incumbent data 114, and customized performance templates), may be transferred or transmitted using any type of data communication technique into platform 102. In some examples, customized performance templates 110 may be developed and used to assess raw performance data 108. Using behavioral data 116, behavioral attributes 117, and survey data 118, a "success profile" may be developed that is configured to be used to perform predictive analysis of raw performance data 108 using a model built by platform 102. In this example, platform 102 may invoke or call learning module 104 and modeling engine 106 to further process raw performance data 108 (as described in greater detail below) against behavioral attributes determined from behavioral data 116 and/or survey data 118. In some examples, "incumbent" may refer to existing data or records associated with items, persons, or objects that are not necessarily part of a population or pool of data to be processed to identify specific candidates. As an example, "incumbent" data may refer to existing data records for an employee while raw performance data may be associated with a new candidate for employment from an external or internal source. An "incumbent" (and the data associated therewith) may refer to an existing employee who is not necessarily being evaluated for a position within an organization, but may already be assigned to the given organizational function or department that is using the techniques described herein to identify a candidate to fulfill a given role, region, or other need. Alternatively, "incumbent" data may also refer to any type of existing data that is not necessarily the subject of processing using a model developed using the techniques described herein. "Incumbent data" may also describe data against which raw performance data 108 may be processed.

Referring back to FIG. 1A, when raw performance data 108 is input to platform 102, platform 102 performs processing (described in greater detail below) using learning (e.g., deep learning, machine learning, artificial intelligence ("AI")-related algorithms) module 104 and modeling engine 106 to run a model (not shown) against behavioral attributes 117 (e.g., determined from behavioral data 116) and/or survey data 118. For reference, any of databases 108, 116, 118, and 120-128 may be implemented as data repositories, data facilities, data warehouses, or other data storage mechanisms (i.e., software, hardware, circuitry, or combination thereof), without limitation or restriction.

As shown, raw performance data 108 is processed against a model (not shown), which may be a data processing model or data model that is used to evaluate, analyze, or otherwise process data, and which may be stored, retrieved, indexed, cataloged, or otherwise managed by model options 122 and/or model candidates 124. In some examples, a model may be generated by modeling engine 106 and platform 102 by using training data 120 to run against raw performance data 108 input to platform 102. By quantitatively measuring the effectiveness of processing raw performance data 108 processing using a model developed by platform 102 and selected by learning module 104 and/or modeling engine 106 using model options 122 and model candidates 124, output performance data 128 is generated and, in some examples, may be transferred or otherwise transmitted to client 132 over data network 130 to be displayed on, for example, display/interface/dashboard 134 (as used herein, "display/interface/dashboard 134 may be referred to interchangeably as "display 134," "interface (i.e., display interface or graphical user interface) 134," "dashboard 134," or "manager dashboard 134," without limitation or restriction).

In some examples, client 132 may refer to any type of device, instance, implementation, system, or the like in data communication with platform 102. Although shown in the example of FIG. 1A as being indirectly connected (i.e., "coupled") to platform 102 over data network 130 (i.e., network 130), client 132 may be in direct or indirect data communication with platform 102. In other examples, client 132 may be in data communication with platform 102 (as described in greater detail below) and one or more of any elements shown or not shown in system 100. Although FIG. 1A illustrates induction document 136 being transmitted over network 130, in other examples, induction document 136 may also be transmitted directly or otherwise transferred directly to platform 102. Further, induction document 136 may also be transmitted or otherwise transferred to platform 102 from a source other than client 130.

Platform 102, as described herein, is configured to generate, modify, and store data models that may be applied to any type of data population, pool, problem, or query. In some examples, models generated by platform 102 may be developed with various options (e.g., different models may be developed to have different features or functionality such as options for processing different fields, types, formats, or schema of data, different deep learning and/or machine learning algorithms, different training datasets that are used to develop the models, or the like, without limitation or restriction), which may be identified and stored in model options 122. In some examples, platform 102 may be configured to assign a unique identifier to a given model based on a set of options stored in model options 122. Individual models may be developed and applied to raw performance data 108 as "model candidates" and stored in model candidates database 124, in some examples. Here, model candidates 124 may refer to a set or group (logically or non-logically arranged) of models that were generated by platform 102 to evaluate raw performance data 108, but may be varied due to a number of factors, including the type or number of deep learning or machine learning algorithms used in the models as generated by platform 102 and modeling engine 106. Further, models, once developed, may be generated, developed, refined, modified, or otherwise trained to achieve quantitative levels or thresholds of accuracy, precision, or recall. In other examples, models, when run against training data 120, may have results returned from the models to be measured against exit criteria 126. In some examples, exit criteria 126 may include various types of objective and subjective criteria such as data thresholds, limits, or parameters determined using data science, behavioral science or other techniques. Additionally, exit criteria 126 may also include parameters established qualitatively using, for example, organizational criteria, limits, thresholds, or parameters based on behavioral attributes 117 and/or survey data 118. Using exit criteria 126, platform 102 may, in some examples, be configured to select a model from model candidates 124 and used to generate output performance data 128. Once a model has been selected, platform 102 may be configured to deploy the selected model to a host system other than system 100. For example, platform 102 may be utilized to generate a model that is configured to generate output performance data by using deep learning or machine learning algorithms to generate a data model that is used to process raw performance data 108 against behavioral attributes 117 and behavioral data 116 while also using incumbent data 114 or survey data 118. In some examples, "output performance data" may refer to a profile or template produced by a model generated by platform 102 that, when used to evaluate (i.e., analyze) raw performance input 108 (having individual raw performance records 112), produces desired, ideal, preferred, or otherwise resultant candidate data, which may be used to indicate, for example, a "successful" candidate, a "success profile" of candidate data, or a data solution identified and selected from a population of data (i.e., raw performance data 108). For example, platform 102 may be used to generate a model that produces a success profile for an organization seeking to evaluate a pool of potential employable candidates for roles (e.g., sales, inside sales, outside sales, field sales, business development, strategic partners, or the like) within an organization. Using incumbent data gathered from records and profiles of existing sales personnel, customized performance template(s) 110 may be developed and used to evaluate raw performance data 108 of the potential employable candidates using a model generated by platform 102 and result in output performance data 128, which may include a "success" profile that is determined based on, for example, identifying patterns, matches, or other characteristics or attributes that indicated ideal, preferred, or otherwise desirable candidates (i.e., in the form of candidate data (not shown) that may be rendered for display on a "manager dashboard" (e.g., display/interface/dashboard 134) or a graphical user interface (hereafter "interface") that is used to manage, run, observe results from, or otherwise provide a human-computing interface or machine-to-machine computing interface with platform 102 and models generated therefrom). Training data 120 may be assembled using incumbent data 114 (i.e., data from behavioral data 116 and/or survey data 118 (e.g., WerkStyle™ surveys as developed by Aptology, Inc. of San Francisco, Calif., Item Response Theory (IRT)-based surveys, or any other type of survey, which may include items (e.g., questions) of any type and quantity (e.g., 10, 20, 34, 50, 10,000, more, or less multiple choice, essay, or other types of questions, without limitation or restriction, but which provide parameters, characteristics, or attributes that can be used to standardize modeling, training, testing, and other processes such as those described herein) and used to train a model generated by platform 102. Models, once generated by platform 102, may be stored in model candidates 124 along with model options 122 and run resulting in output performance data 128. Subsequently, in this example, output performance data 128 and a model used to generate it, may be evaluated against exit criteria 126 to identify a preferred model of those stored in model candidates 122 and deployed. Models may also be run against different categories of data in order to permit learning module 104 (i.e., using implemented deep or machine learning algorithms of any type) to determine if patterns occur when run against particular datasets (e.g., training data 120, raw performance data 108). As used herein, "deployed" may refer to the action or activity of transferring or hosting a model generated by platform 102 to another computing system, application, host (as further defined below in connection with FIG. 1B), computer, server, cloud, or the like. Deployment of a model generated by platform 102 and selected from model candidates 124 is described in greater detail below. In this and other examples, system 100 and platform 102 can be used to generate models that can not only process large amounts of raw performance data 108, but can be trained, using training data 120, to learn (i.e., by applying deep learning or machine learning algorithms or techniques such as supervised, semi-supervised, or unsupervised neural networks (e.g., deep, recurrent, artificial, convolutional, or others, without limitation or restriction implemented by learning module 104) and produce "successful" results produced from evaluating or analyzing against behavioral attributes 117, behavioral data 116, and/or survey data 118. Predictive models generated by platform 102 using the techniques described herein can be applied to large pools of raw performance data 108 (i.e., large population or pools of input data provided to predictive models generated, trained, and tested by platform 102) to develop highly accurate results (e.g., 80% success rates) of identifying solutions (e.g., candidate data or candidates (not shown)) by evaluating a large pool of candidates that, using predictive models generated by platform 102, may be reduced based on behavioral data, baseline attributes, differentiators (i.e., factors or data that may be used to categorize raw performance data 108 into smaller pools, populations, groups subgroups, or sections of data), incumbent data 114 yielded from survey data 118 to produce accurate results in short periods of time regardless of the scale, size, or scope of data (e.g., raw performance data 108, behavioral data 116, survey data 118) being evaluated and/or analyzed. In other words, human-based processing of data such as that described above (e.g., raw performance data 108, behavioral data 116, survey data 118, or others) may require unacceptably long time periods to evaluate and produce results highly susceptible to error, bias, and subjectivity. The techniques described herein result in faster, accurate, and contextually-relevant (using machine and deep learning algorithms (i.e., learning module 106) to generate, train, and test predictive models that transform computing systems on which they are installed into fast learning and processing systems configured to generate output performance data 128, as described herein) results, candidates, resulting or resultant data, candidate data (i.e., all of which may be otherwise referred to as output performance data 128). Examples of output performance data 128 may include any type of data or information that indicates a value associated with a given file, record, candidate, or the like (e.g., "high," "low," "medium," "average," "excellent," "poor," numerical or statistical rankings, or others, qualitatively or quantitatively, with neither limitation nor restriction). In other examples, system 100 and the above-described elements may be implemented differently in function, structure, configuration, topology, or other aspects without limitation or restriction to any specific implementation or instance.

Figure 1B:
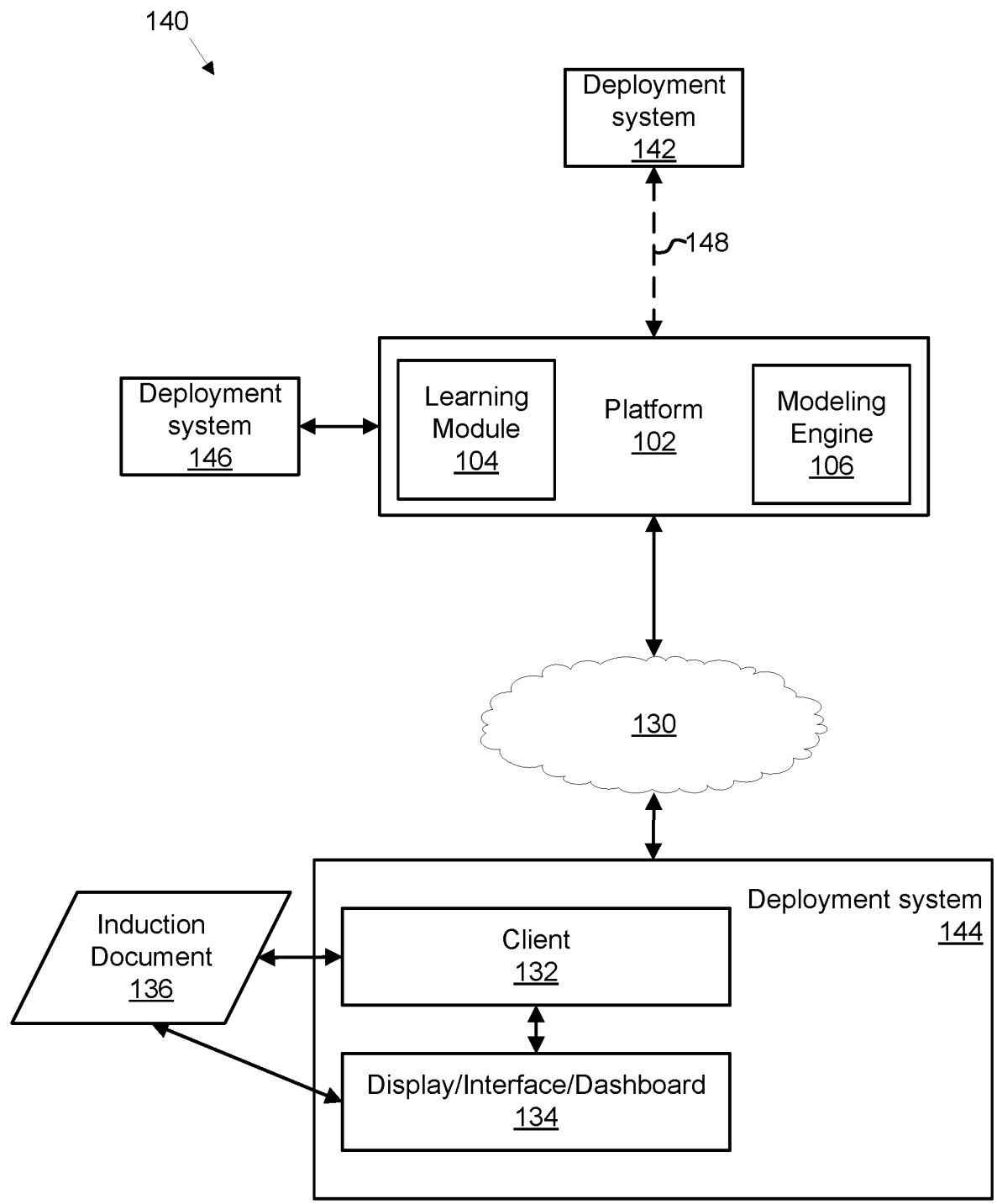
FIG. 1B illustrates an exemplary deployment topology for machine and deep learning process modeling of performance and behavioral data.

FIG. 1B illustrates an exemplary deployment topology for machine and deep learning process modeling of performance and behavioral data. Here, system 140 includes platform 102, learning module 104, modeling engine 106, network 103, client 132, display/interface/dashboard 134, induction document 136, and deployment systems 142-146. In some examples, system 140 may be a network topology that is used to deploy one or more models developed by platform 102, as described above in connection with FIG. 1A and below, to hosts such as deployment systems 142-146.

As shown, deployment systems 142-146 may be in direct or indirect data communication with platform 102. For example, deployment system 142 may be a host on which a model generated by platform 102 may be deployed. As used herein, a "host" may refer to a computing system, platform, application, computer, server, cloud, or other computing device (physical and/or virtual) that houses, stores, operates, compiles, runs, calls, or performs other data operations to run models generated by platform 102 (FIG. 1A). For example, deployment systems 142 and 146 may be hosts that are configured to be in direct data communication with platform 102 using either a direct data communication link (e.g., wired, wireless, optical, or others) or a local data communication link that may include one or more local networking devices. As shown, deployment system 146 may be linked to platform 102 using a wired data communication link. As another example, deployment system 142 may be linked to platform 102 using a wireless data communication link, as indicated by link 148. Although link 148 is shown as a dashed line to indicate a wireless data communication link, data communication links can be either dashed or solid lined in appearance and may include any type of data communication link or transfer techniques (e.g., wired, wireless (radiating or non-radiating), transistor, optical, fluidic, or other conventional or unconventional techniques, without limitation or restriction).

For additional illustration, deployment host 144 is shown including client 132 and display/interface/dashboard 134; together, these elements may refer to a "client site" or "deployment site" at which a model generated by platform 102 may be hosted. Alternatively, deployment host 144 may also be a client computing system in data communication with platform 102 over an indirect data communication link using network 130 (e.g., the Internet, world wide web, or any type of public and/or private data network (e.g., wide area network, local area network, or other type of topology), without limitation or restriction. As shown, display/interface/dashboard 134 may be used at client 132 to construct, modify, transmit, or perform other data operations on induction document 136 that may be transmitted from client 132 (which may or may not be implemented on deployment system 144) over network 130 to platform 102. Once received by platform 102, induction document 136 may be parsed and evaluated by platform 102, learning module 104, and modeling engine 106 to identify raw performance data (e.g., raw performance data 108 (FIG. 1)), behavioral data (e.g., behavioral data 116 (FIG. 1)), attribute data (e.g., behavioral attributes 117 (FIG. 1)), and/or survey data (e.g., survey data 118 (FIG. 1A)) to be used to construct (i.e., develop, generate, produce, or otherwise build a model) and run a model or set of models to generate resultant data (e.g., output performance data 128 (FIG. 1A)). Using training data (e.g., training data 120 (FIG. 1A)) to train and exit criteria (e.g., exit criteria 126) to test a given model, induction document 136 may be parsed and evaluated by models generated by platform 102 in terms of data content (e.g., payload and header data of packets, segments, frames, or other data encapsulation formats), structure (e.g., records, columns, rows, siloes, or other structured or unstructured fields), and context (e.g., metadata, notes, or other structured or unstructured information and data accompanying or included with induction document 136 that may be evaluated by a model and used to generate output performance data 128), without supervision, semi-supervision, or completely unsupervised. In other examples, system 140 and the above-described elements may be implemented differently in function, structure, configuration, topology, or other aspects without limitation or restriction to any specific implementation or instance.

FIG. 2 illustrates an exemplary application architecture for machine and deep learning process modeling of performance and behavioral data. Here, application architecture 200 is an example implementing the techniques described herein, including various component modules, engines, and other functions that may be implemented as software, hardware, circuitry, or a combination thereof. As shown, application 202 includes data bus 204, deep learning module (e.g., learning module 104 (FIG. 1A)), behavioral data module 208, logic module 210, modeling engine 212 (e.g., modeling engine 106 (FIG. 1A)), ranking module 214, data mining module 216, display module 218, query manager 220, performance data module 222, machine learning module 224, survey module 226, model tracker module 228, and application programming interface (API)/communication module 230. In some examples, application 202 may be configured to be in direct or indirect data communication with data repository 232, which may be implemented in structure and function to any of raw performance data 108, behavioral data 116, survey data 118, training data 120, model options data 122, model candidates data 124, exit criteria data 126, output performance data 128, some of which are configured to store customized performance template 110, raw performance data 112, and/or incumbent data 114, as described above in connection with FIG. 1A.

Referring back to FIG. 2, here data may be transferred between any of elements 206-232 using data bus 204, which may be implemented as a wired or wireless data communication link. Further, one, some, or all of elements 202-232 may be implemented as software, hardware, circuitry, or a combination thereof. For example, application 202 may be implemented entirely as a software-based application that is hosted on a computing platform (e.g., platform 102) and resident to a single or multiple-processor (regardless of the number or type of processing cores (e.g., silicon transistor, quantum, or others) system. For example, application 202 may be hosted (i.e., housed) on a single computer or server and each of elements 204-232 may be individual software applications, programs, threads, or the like that are called, invoked, instanced, or otherwise run by logic module 210. In other examples, application 202 may be implemented on different computing platforms or systems, regardless of geographic proximity, technical architecture, network topology, or data/telecommunication infrastructure. For example, each of elements 204-232 may be implemented in a computing cloud (i.e., "cloud") and stored using virtual or physical elements. Data repository 232 may be implemented using any data storage facilities of any type, structure, format, or schema such as databases, data warehouses, data facilities, data storage clouds, data storage networks, or others, without limitation or restriction. As described herein, application 202 may be configured to transfer, transmit, receive, or otherwise store data in data repository 232. Although shown as a single instance of a data facility, data repository 232 may be implemented as multiple instances of a data facility such as a data storage network, data storage cloud, a cluster of databases, or multiple disparate databases, one or more of which can be used to implement any, some, none, or all of raw performance data 108 (FIG. 1A), customized performance template 110 (FIG. 1A), raw performance data 112 (FIG. 1A), incumbent data 114 (FIG. 1A), behavioral data 116 (FIG. 1A), survey data 118 (FIG. 1A), training data 120 (FIG. 1A), model options data 122 (FIG. 1A), model candidates data 124 (FIG. 1A), exit criteria data 126 (FIG. 1A), and output performance data 128 (FIG. 1A). Here, application 202 and any of elements 204-230 may be implemented in a cloud or on a network in which one or more virtual and/or physical machines are used for implementation, execution, management, diagnostic, maintenance, or other purposes. In a distributed and/or logical computing environment such as a cloud-based implementation (e.g., Google® Cloud by Google, Inc. of Mountain View, Calif., Amazon Web Services® of Amazon Technologies, Inc. of Seattle, Wash., or other hosted computing services such as those provided by Oracle®, Microsoft®, HP®, or others), logic module 210 may be a multi-threaded executable application or program that, when receiving induction document 136 (FIG. 1A), generates and transmits a call (i.e., sends an instruction, query, or request to another program, application, engine, module, or other component) to one or more of elements 206, 208, or 212-232.

Here, API/communication module 230 is configured to receive input from a client, host, deployment site, model, platform, or other component, such as those described herein, such as induction document 136 (FIG. 1A), raw performance data 108 (FIG. 1A), behavioral data 116 (FIG. 1A), survey data (FIG. 1A), or others, without limitation or restriction. In some examples, induction document 136 or other data may be transferred between application 202 and other components using API/communications module 230, which is configured to transmit, receive, handle, interpret, format, and perform other functions for transforming data that may be used for various operations such as those performed by any of elements 206-232. When data is received by API/communication module 230 (e.g., from an external source such as client 132 (FIG. 1A), database 232, or others, logic module 210 determines what type of data is being processed and the process(es) to be invoked for further execution or runtime operation against the received data. In some examples, processes to be invoked are discussed in greater detail below in connection with FIG. 3.

Referring back to FIG. 2, learning module 104 (FIG. 1A) may be implemented to include deep learning module 206 and machine learning module 224. While deep learning may, in some examples, be a sub-type of machine learning algorithms, deep learning module 206 and machine learning module 224 are examples of components that may be configured to invoke, call, instance, or otherwise run various types of deep or machine learning algorithms, without limitation or restriction to any specific type, edition, version, or algorithm. Fewer, more, or different types of machine learning algorithms may, in other examples, involve other deep learning (e.g., neural network-based, or others), machine learning (e.g., neural networks, Bayesian, federated learning, supervised, semi-supervised, unsupervised, decision trees, genetic, or others) or AI-related modules and are not limited to the examples shown and described. Deep learning module 206 and machine learning module 224 may be configured, implemented, and used to generate, develop, modify, train, and test models for processing different types of data handled by application 202 (e.g., raw performance data 108 (FIG. 1A), behavioral data 116 (FIG. 1A), survey data 118 (FIG. 1A), output performance data 128 (FIG. 1A), or others).

In some examples, behavioral data module 208, ranking module 214, data mining module 216, and performance data module 222 may be configured, implemented, and used to process incoming data (e.g., input performance data such as raw performance data 108, raw performance data file 112, incumbent data file 114, behavioral attribute data file 117, or others) to application 202, in some examples. Further, raw performance data 108 (FIG. 1A) may be evaluated by application 202 using logic module 210, ranking module 214, and data mining module 216 to evaluate and validate one or more aspects of raw performance data 108 (FIG. 1A) prior to initiating development of one or more data models using deep learning module 206, logic module 210, modeling engine 212, and machine learning module 224. Some aspects of raw performance data 108 (FIG. 1A), behavioral data 116 (FIG. 1A), or others may include the structure of the data file in which the data is being input to application 202, context, metadata, row or columnar alignment, individual field correlations (e.g., role, region, name, MemberID, or others, without limitation or restriction). Further, raw performance data 108 (FIG. 1A) may be evaluated by application 202 using logic module 210, ranking module 214, and data mining module 216 to force rank incumbent data 114, which may detail existing data against which input raw performance data 108 may be evaluated. For example, in an organization, incumbent data 114 may include data associated with employees in particular roles and detail a quantitatively and qualitatively established level of performance such as success, fail, high, medium, low, or the like. A forced ranking may list numerical, statistically, quantitatively, or otherwise, "incumbents" (i.e., preexisting data files or records of items that are not intended for evaluation by a model generated by application 202 or platform 102 (FIG. 1A)) to be later used by logic module 210, modeling engine 212, performance data module 222, and others to evaluate raw performance data input to application 202.

In some examples, modeling engine 212 may invoke deep learning module 206 and machine learning module 224 to generate a model that may be run against raw performance data 108 (FIG. 1A), behavioral data 116 (FIG. 1A), and/or incumbent data stored 114 (FIG. 1A) stored as part of raw performance data 108, but parsed from induction document 136 (FIG. 1A) by data mining module 216 (using CRISP-DM or other data mining protocols), ranking module 214 (e.g., forced ranking of individual raw performance files (e.g., multiple incoming raw performance file 112), performance data module 222, and/or behavioral data module 208. Once raw performance data has been validated, it may be evaluated by one or more models generated by modeling engine 212 and the results may be displayed on a client (not shown) on a display interface such as a management dashboard that is configured to render and display data provided by application 202 using, for example, display module 218 and API/communication module 230. For example, a user at a system host (i.e., a computing system or set of computing systems, computers, computing devices, or the like on which application 202 and/or a model generated by application 202 may be hosted, served, stored, executed, or run) may access client 132 (FIG. 1A) using a graphical user interface (hereafter "interface") that is identified as a "manager dashboard" (i.e., an interface configured to access and run one or more models generated by application 202 against input data such as raw performance data 108 (FIG. 1A)). Pointing, loading, directing, or otherwise inputting data such as raw performance data 108 (FIG. 1A) from data repository 232, instructions input at display/interface/dashboard 134 (FIG. 1A) hosted on a client (e.g., client 132 (FIG. 1A)) and sent (i.e., via a direct or indirect (e.g., networked) data communication link using any type of data communication protocol such as HTTP, TCP/IP, or others) to application 202, display module 218 may be used to receive, interpret, or otherwise process instructions to application 202 to evaluate, process, and generate output performance data from performance data module 222. Processing of input raw performance data to generate output performance data, application architecture 200, and elements 202-232 may be implemented, configured, or perform differently than as described above, which is provided for exemplary purposes.

Figure 3:
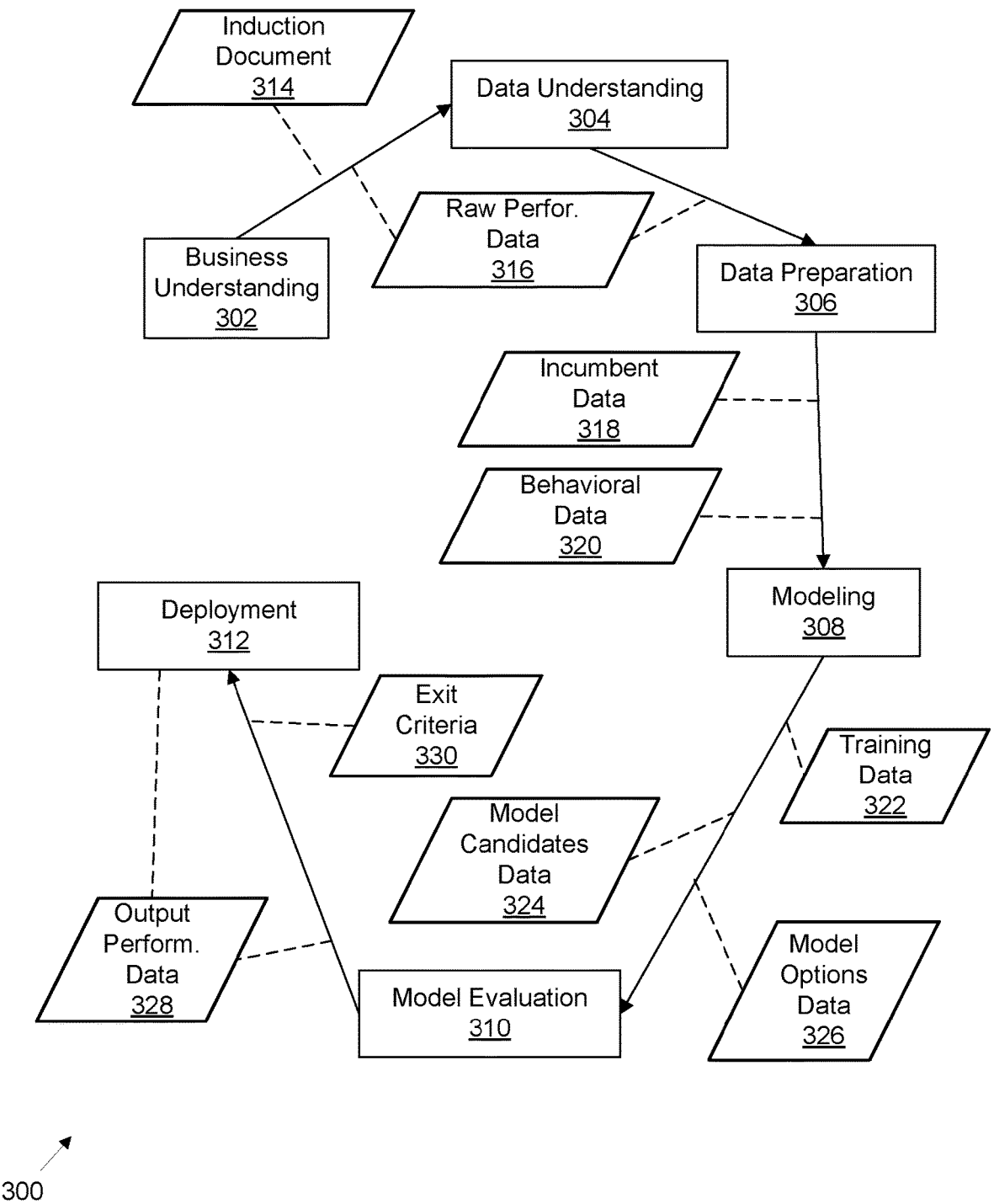
FIG. 3 illustrates an exemplary process and data flow for machine and deep learning process modeling of performance and behavioral data.

FIG. 3 illustrates an exemplary process and data flow for machine and deep learning process modeling of performance and behavioral data. Here, process and data flow 300 includes processes 302-312 and data types 314-330. In some examples, system 100 (FIG. 1A) and application architecture 200 (FIG. 2) may be implemented for various types of consumer, commercial, industrial, technological, or organizational applications. As an example, models generated by application 202 (FIG. 2) may be implemented for use in evaluating a business' organizational effectiveness of personnel in a given role or region or new employees being reviewed for positions within existing roles, regions, or the like. As shown, business understanding process 302 may be used to identify and determine various entry factors, thresholds, attributes, or other data fields that may be used for modeling and runtime execution of models. Examples of entry factors could be key performance indicators (KPI), which may be attributes that a business has determined represent important points of determining whether a given employee fits within a given role, region, function, department, or the like. In other examples, a key performance indicator may represent a data field or item that can be used by a model generated by application 202 to determine whether a given employment candidate or employee is performing at a "high," "medium," or "low" level of performance. In still other examples, a KPI may represent a different type of data field or item. Regardless, after completing business understanding process 302, induction document 314 may be generated and include raw performance data 316, which is then used in data understanding process 304. As shown, data understanding process 304 may include validating, as described herein, input performance data such as induction document 314 and/or raw performance data 316. As an alternative example, raw performance data 316 may also be input after business understanding process 304 in which only induction document 314 is used to provide data for business understanding purposes. After business understanding process 304 is performed and using the results of evaluating induction document 314 and raw performance data 316 for validating structure, context, or other aspects of raw performance data to be run using one or more models generated by, for example, platform 102 (FIG. 1A) and application 202, data preparation process 306 is performed.

In some examples, data preparation process 306 may include validating, correlating, or other functions to ensure data to be used by a given model is structured, formatted, or otherwise pre-processed to enhance precision, accuracy, recall, or the like. Further, one or more models generated by application 202 (FIG. 2) may use other types or data when evaluating raw performance data 108 (FIG. 1A). For example, incumbent data 318 and behavioral data 320, as described herein, may be used by modeling process 308. After generating a model(s), modeling process 308 may also invoke, call, retrieve, query, request, generate, produce, modify, develop, or otherwise use training data 322, model candidates data 324, and model options data 326.

In some examples, training data 322 may be a dataset that includes incumbent data 318 and/or behavioral data 320, or other data that can be used to train a model to achieve desired levels of performance, effectiveness, or output. For example, training data 322 may be a set of raw performance data that was used for prior models. Given the use of prior raw performance datasets, a model may be expected to generate or exceed a given level of performance (e.g., a quantitative or qualitatively established level of quality, accuracy, precision, recall, or the like) when used to train a newly-generated model by platform 102 (FIG. 1A) and application 202 (FIG. 2). Depending upon the performance of a model relative to a given threshold or level, then a model may be discarded, ranked, assigned a numerical or statistical score, assigned an identifier (e.g., MemberID), or the like, and stored in model candidates data 324 along with options for running the model in model option data 326.

Here, after a model is generated, model evaluation process 310 is performed in which a model is further evaluated against exit criteria that have been previously developed to determine whether a model can be selected for deployment process 312. Exit criteria may include any type of quantitative or qualitative measure for selecting a model for deployment, which can include data science, behavioral science, computer science, or organizational criteria such as performance levels, quality, accuracy, precision, recall, latency, or others, without limitation or restriction. Once selected and deployed in deployment process 312 and model evaluation 310, output performance data 328 may be generated, which may include the results of evaluating raw performance data 316 using a model that also queries and retrieves incumbent data 318 and behavioral data 320 to ensure output performance data 328 is accurate, precise, or other aspects desired of a given model (i.e., exit criteria 330). As shown and described, process and data flow 300 and elements 302-330 may be implemented differently and are not limited to the structure, function, order of execution or performance of processes 302-312 or data types 314-330.

Figure 4A:
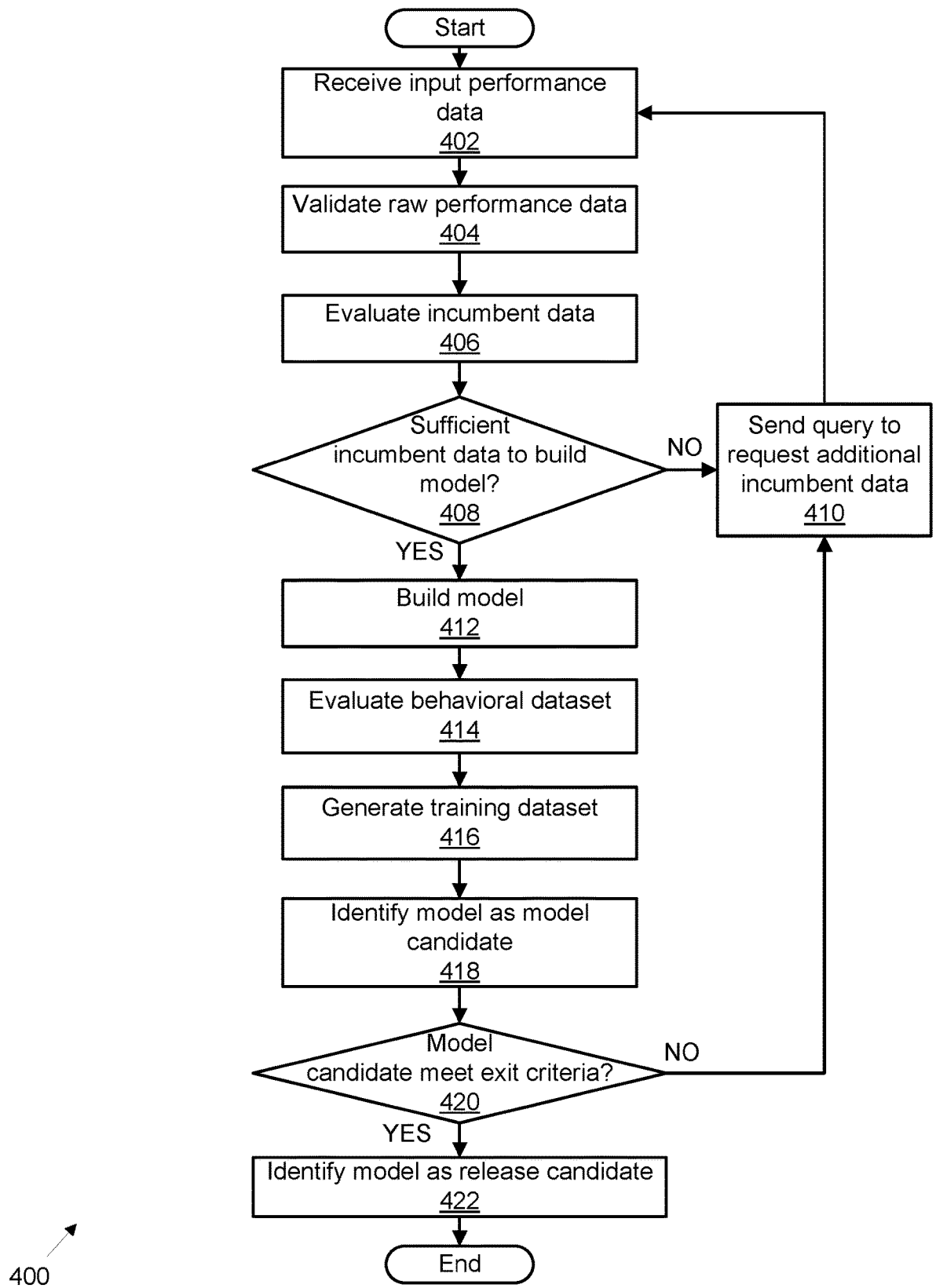
FIG. 4A illustrates an exemplary process for machine and deep learning process modeling of performance and behavioral data.

FIG. 4A illustrates an exemplary process for machine and deep learning process modeling of performance and behavioral data. In some examples, process 400 may be performed by platform 102 (FIG. 1A) and application 202 (FIG. 2), which may be varied in step, order, function, and other aspects, without limitation or restriction. Here, process 400 begins by receiving input performance data (e.g., raw performance data 108 (FIG. 1A)) (402). Upon receipt, the raw performance data is validated, in some examples, as described above (404). As described above, incumbent data is evaluated by logic module 210 (FIG. 2), ranking module 214 (FIG. 2), data mining module 216 (FIG. 2), and performance data module 222 (FIG. 2) to determine various attributes against which raw performance data and behavioral data can be evaluated by one or more models generated by modeling engine 212 (FIG. 2). A determination is made as to whether evaluated incumbent data is sufficient for constructing a model using, for example, modeling engine 212 (408). If evaluated incumbent data insufficient, then query manager 220 (FIG. 2) is instructed by logic module 210 (FIG. 2) to generate and send a message (using any type of data messaging protocol, including but not limited to HTTP, SMTP, TCP/IP, IRC, and others, as listed and described above) to client 132 (FIG. 1A) requesting additional incumbent data (410). In response, additional incumbent data may be transmitted to application 202 (FIG. 2) for processing (402).

Alternatively, if a determination (408) is made that sufficient incumbent data is present, then an instruction is sent from logic module 210 (FIG. 2) to modeling engine 212 (FIG. 2) to build a model to run against raw performance data 108 (FIG. 1A), behavioral data 116 (FIG. 1A), survey data (FIG. 1A), and/or incumbent data (412). Once built, a model is evaluated using behavioral data 116 (FIG. 1A) (414). In some examples, evaluating a model may include generating a training dataset (e.g., training data 120 (FIG. 1A) to run against the model (416) and the model, either before, during, or after training, may be identified as a model candidate (418). Once identified as a model candidate and during evaluation, a model is evaluated further to determine whether it meets or exceeds exit criteria, as discussed above (420). If exit criteria are not met, then incumbent data is requested again (410) and process 400 begins anew (402).

However, if a model candidate meets exit criteria, then it may be identified as a "release candidate" (i.e., a model that may be released for deployment and configured for execution (i.e., run) against input performance data (e.g., raw performance data 108 (FIG. 1A)). In some examples, when a model is identified as a release candidate, it may be included in a group of model candidates that have been identified as release candidates. In other words, raw performance data 108 (FIG. 1A) could be configured to be processed using multiple models, some of which are configured to process and identify data for specific criteria while others could be used to identify different criteria or parameters or other output performance data (e.g., output performance data 128 (FIG. 1A). In still other examples, release candidates may also refer to models that have been developed in a production (i.e., system or operating environment) of platform 102 (FIG. 1A) before being deployed to a target site such as a client's operating system or environment. In still further examples, release candidates may be deployed to a client system, site, or environment on a "rolling" or ongoing basis as subsequent models are developed that seek to improve on earlier or prior models. In yet other examples, process 400 and accompanying subprocesses may be designed, implemented, ordered, or performed differently and are not limited to those shown and described.

Figure 4B:
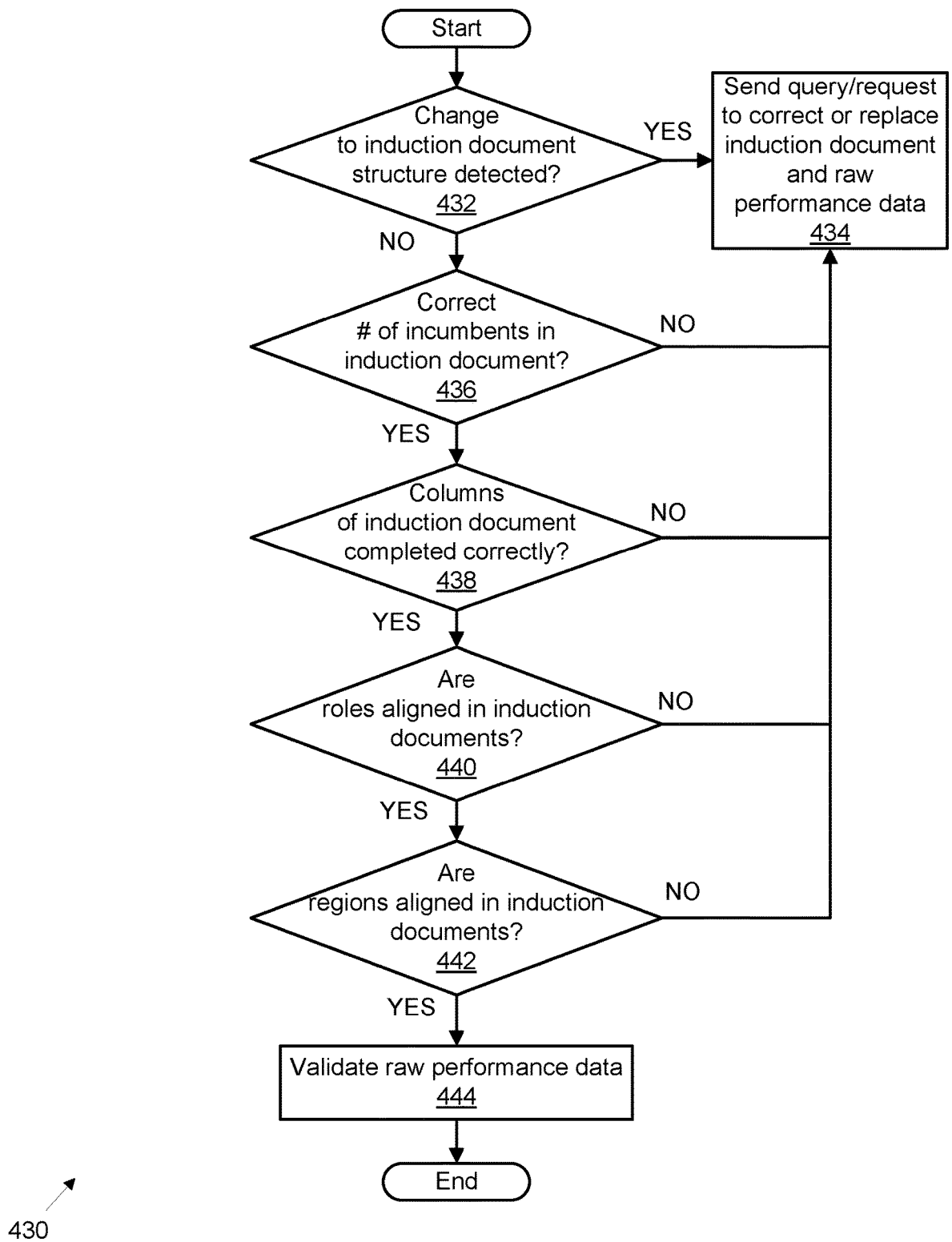
FIG. 4B illustrates an exemplary process for validating the structure and context of a raw performance data file for machine and deep learning process modeling of performance and behavioral data.

FIG. 4B illustrates an exemplary process for validating the structure and context of a raw performance data file for machine and deep learning process modeling of performance and behavioral data. Here, process 430 may be an exemplary implementation of a validation subprocess (i.e., 404) as described above in connection with FIG. 4A. In some examples, when raw performance data 108 (FIG. 1A) is validated, a subprocess is initiated in which a determination is made as to whether a change to the structure of a received induction document (FIG. 1A) has been detected (432). If a change to the structure of a received induction document (e.g., induction document 136 (FIG. 1A)), then query manager 220 (FIG. 2) generates and sends a query request (i.e., to client 132 (FIG. 1A)) for additional, replacement, supplemental, or other raw performance data (434).

Alternatively, if a determination is made a received induction document does not have any changes to the data structure in which the raw performance data (or other types of data) is stored, then a further determination is made as to whether the induction document includes the correct number of incumbents (436). In some examples, a "correct" number of incumbents can be established in different ways. For example, matching techniques may be used to determine if a number of incumbents established from a prior test or execution run of a model matches the number of incumbents identified in a newly-received induction document. As another example, a user or system-specified number of incumbents may be used as a threshold or criteria for validating an induction document. In still other examples, determining a "correct" number of incumbents may be performed differently and is not limited to the examples shown or described.

If a correct number of incumbents is not met (i.e., FAIL, threshold is not met, incorrect parameter or number is returned), then a query or request (i.e., a query request) may be sent by query manager 220 (FIG. 2) to, for example, client 132 (FIG. 1A) requesting additional, replacement, supplemental, or other raw performance data, which may be transferred in the form or format of an induction document (e.g., induction document 136 (FIG. 1A)). If a determination is made that an induction document includes a correct number of incumbents (i.e., includes, contains, stores, or retrieves) incumbent data sufficient to build or construct a model, then a further determination is made as to whether the columns of an induction document are completed correctly (438). In examples where structured data formats are used to transfer, store, query (i.e., request), retrieve (i.e., GET), or perform other operations on raw performance data 108 (FIG. 1A), determining the correct number of columns in an induction documents aids a model during runtime execution by preventing errors due to mismatched columnar data being processed. Likewise, the use of other types of data structures or unstructured data could result in different subprocesses being used to validate an induction document.

Referring back to FIG. 4B, a further determination may be made as to whether data configured to identify a role, as parsed from raw performance data 108 (FIG. 1A) is aligned with behavioral data 116 (FIG. 1A), as determined by a model(s) built by platform 102 (FIG. 1A) and application 202 (FIG. 2) (440). If data indicating a role is not aligned with pre-existing data such as behavioral data 116 (FIG. 1A), then a query is generated and sent by query manager 220 (FIG. 2) requesting further (i.e., additional, supplemental, complementary, replacement, new, or other raw performance data other than raw performance data 108 (FIG. 1A)). If a determination is made that data included in raw performance data 108 (FIG. 1A) indicates roles are aligned, then another determination is made as to whether data identifying a region associated with raw performance data 108 (FIG. 1A) is aligned with pre-existing data referenced by a model (442). In other examples, fewer, more, or different determinations may be made as to data alignment between raw performance data 108 (FIG. 1A) and other pre-existing data (e.g., behavioral data 116 (FIG. 1A), incumbent data 114, or others, without limitation or restriction). If misalignment or non-alignment are found, then a query/request is generated by query manager 220 (FIG. 2) requesting raw performance data (as described above) to supplement, complement, replace, or partially replace induction document 136, raw performance data 108 (FIG. 1A), behavioral data 116 (FIG. 1A), incumbent data 114, or any other data being used for validation as described herein. As used herein, determining whether data received in induction document 136 (FIG. 1A), raw performance data 108 (FIG. 1A), behavioral data 116 (FIG. 1A), incumbent data 114, or any other data being used for validation may be performed using various techniques including determining whether data is found in a given row, column, field, cell, or other data structure. For example, misalignment of data configured to indicate a role or region may be determined if found in a row, column, field, cell, or other data structure that does not match with data referenced by a model generated by platform 102 (FIG. 1A) and application 202 (FIG. 2)), but may be adjusted by learning module 104 (FIG. 1B) using deep learning or machine learning algorithms that can not only identify the structural misalignment, but also interpret contextual data that can be used to guide realignment. Using techniques such as those described herein, application 202 can perform process 430 not only against a single induction document, but possibly thousands or millions of input induction documents permitting highly scalable, accurate, precise, and fast processing of raw performance data 108 (FIG. 1A) to identify output performance data 128 (FIG. 1A). Data, in some examples, may be categorized as "non-aligned" if particular data sought by a given model is not found entirely in induction document 136 (FIG. 1A) and, in some examples, may be unavailable for alignment by a model(s) generated by modeling engine 106 (FIG. 1A) and instead a query for raw performance data is generated by query manager 220, including, in some examples, a message that includes an indication or instruction for corrective data or action to prevent misalignment or nonalignment. In other examples, alignment may be determined differently than as described and is not limited to the examples shown and described. After completing determinations of whether raw performance data 108 (FIG. 1A) is aligned with regard to specific types, fields, categories, rows, columns, or other data (e.g., 440, 442), an instruction may be sent by logic module 210 to modeling engine 212 and data mining module 216 that validation is complete (i.e., raw performance data is validated) (444). Further, by using application 202 (FIG. 2) and implementing the elements shown (e.g., 204-232), a general purpose computing device can be transformed to perform specialized data parsing, processing, and modeling in order to generate a model that produces output performance data that can increase the effectiveness of an organization by providing data insights into efficiency, efficacy, context, accuracy, precision, and recall. In still other examples, process 430 and subprocesses (or data operations) 432-444 may be designed, implemented, ordered, or performed differently and are not limited to those shown and described.

Figure 4C:
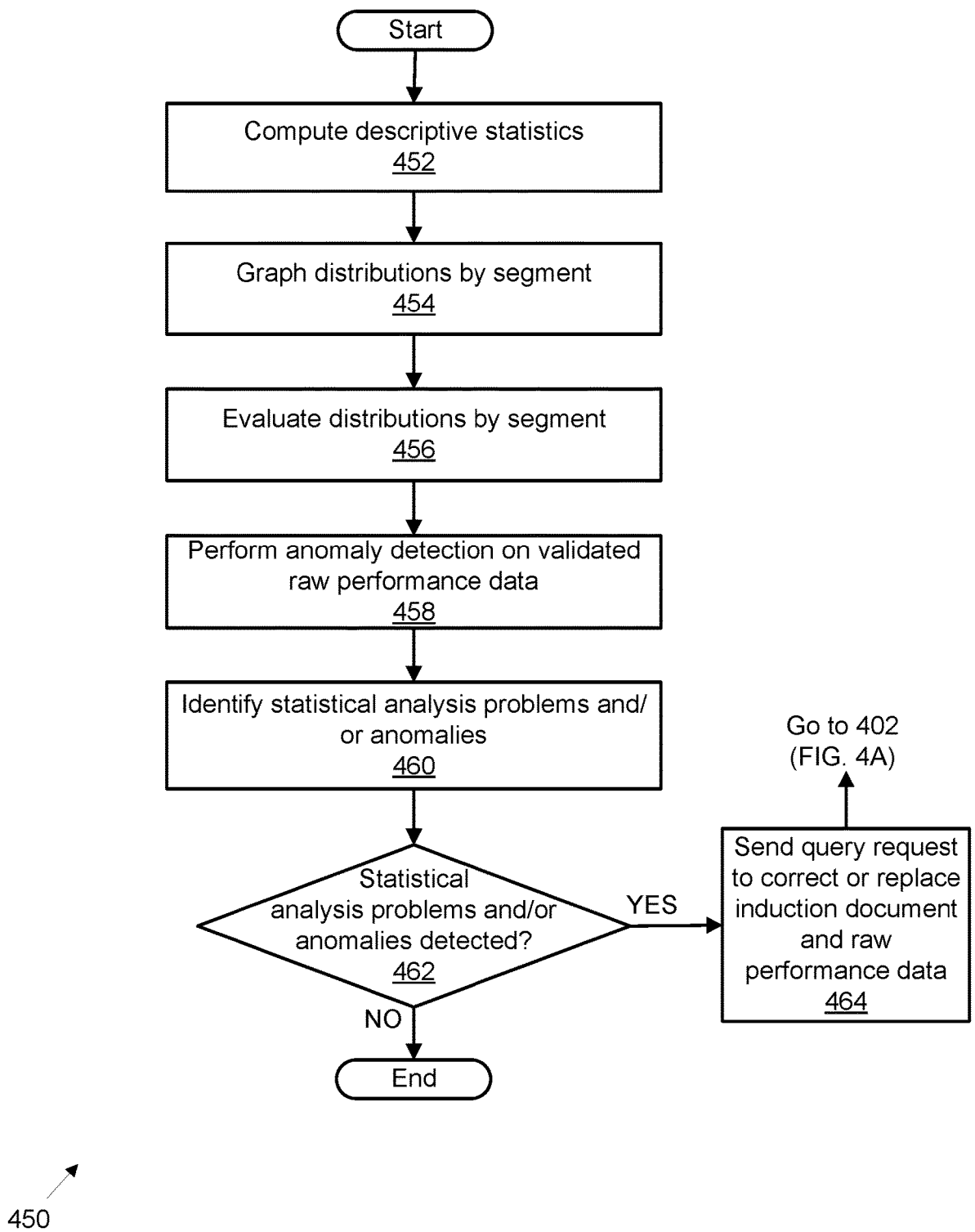
FIG. 4C illustrates an exemplary process for statistical analysis, anomaly detection, and validation of raw performance data for machine and deep learning process modeling of performance and behavioral data.

FIG. 4C illustrates an exemplary process for statistical analysis, anomaly detection, and validation of raw performance data for machine and deep learning process modeling of performance and behavioral data. In some examples, process 450 may be used to perform statistical analysis to validate raw performance data as described above. Here, process 450 begins by computing descriptive statistics (452). Next, statistical distributions of raw performance data may be graphed (i.e., visually plotted or using a chart or plot to graph various points associated with various data within raw performance data 108 (FIG. 1A) to create a visual or graphical depiction of the plotted distribution) by segment, category, region, role, department, function, or any other type of category or sub-category used to classify raw performance data 108 (FIG. 1A). Distributions may then be evaluated (456). After graphing and evaluating distributions of raw performance data 108 (FIG. 1A), anomaly detection may be performed on validated raw performance data (458). For example, a graph or visual depiction such as a plot may reveal outliers (i.e., plots of data that fall outside of a plotted or normal distribution curve or that fall outside of a given acceptable range of error or deviation from a median value for a given curve associated with graphed distributions). By evaluating distributions of the validated raw performance data (e.g., raw performance data 108 (FIG. 1A) after validation by logic module 210 (FIG. 2), modeling engine 212 (FIG. 2), data mining module 216 (FIG. 2), and query manager 22 (FIG. 2) as described above), potential problems, issues, outliers, and anomalies (hereafter collectively referred to as "anomalies") are identified (460). A determination is made as to the potential anomalies (462) and, if an identification is made that there are statistical analysis or anomaly resolution problems, then application 202 (FIG. 2) and/or query manager 220 (FIG. 2) is configured to generate and send a query/request for resolution to client 132 (FIG. 1A) or to request sending raw performance data to replace (i.e., perform data operation 402 (FIG. 4A)) raw performance data 108 (FIG. 1A) and induction document 136 (FIG. 1A) (460). In other examples, process 450 and sub-processes (i.e., data operations) 432-444 may be designed, implemented, ordered, or performed differently and are not limited to those shown and described.

Figure 4D:
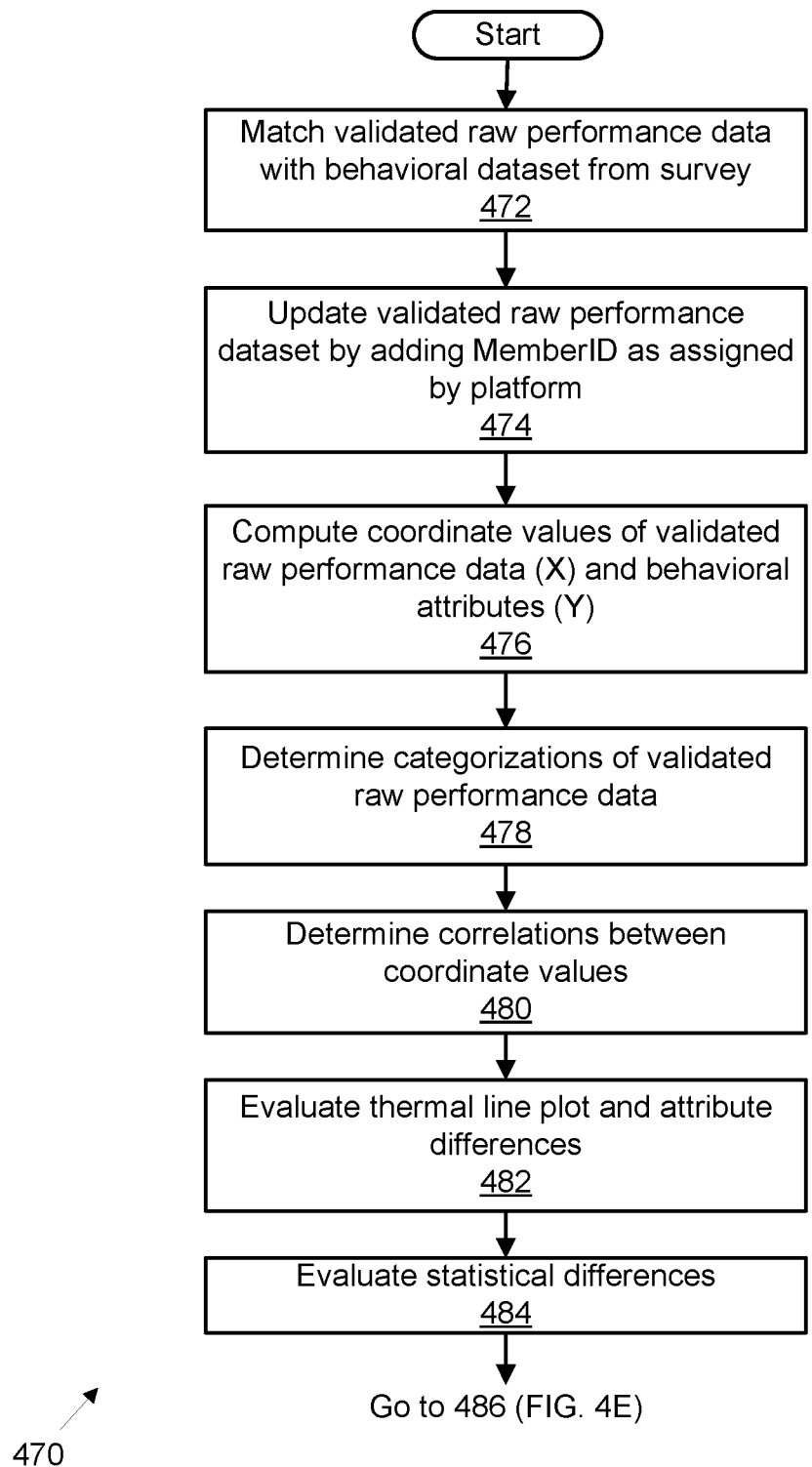
FIG. 4D illustrates an exemplary process for statistical analysis of a training dataset built for a machine and deep learning process model for performance and behavioral data.

FIG. 4D illustrates an exemplary process for statistical analysis of a training dataset built using a machine and deep learning process model for performance and behavioral data. In some examples, after modeling engine 212 (FIG. 2) has built (i.e., generated, developed, or constructed a model using raw performance data 108 (FIG. 1A), incumbent data 114 (FIG. 1A), behavioral data 116 (FIG. 1A), survey data 118 (FIG. 1A), or others, as described above), a training data which may be configured to be stored in training data 120 (FIG. 1A), can be built and used to test any model from platform 102 (FIG. 1A) and application 202 (FIG. 2). Here, process 470 begins by matching validated raw performance data (as determined, in some examples, in the above-described process 430 of FIG. 4B) (472) with behavioral data 116 (FIG. 1A) from one or more surveys generated of an organization being evaluated using platform 102 (FIG. 1A) and application 202 (FIG. 2) (472). Next, validated raw performance data is updated by adding an identifier (e.g., MemberID, or any other type of unique identifier that can be used to locate, identify, retrieve, store, or perform other data operation by referencing an individual file or record within the validated raw performance data (i.e., raw performance data 108 after being validated) as assigned by platform 102 (474). In some examples, an identifier may be assigned by logic module 210 (FIG. 2), data mining module 216 (FIG. 2), performance data module 222 (FIG. 2), survey module 226 (FIG. 2), or any other module configured to generate a label for each individual file or record within raw performance data 108 (FIG. 1A)). After assigning a unique identifier such as a MemberID to each file or record within validated raw performance data 108 (FIG. 1A), each file or record within raw performance data 108 (FIG. 1A) is assigned a computed coordinate value along an axis (e.g., X-axis, Y-axis) of a two-dimensional graph or plot (used hereafter interchangeably as either "graph" or "plot") and each file or record within behavioral data 116 (FIG. 1A) is assigned another computed coordinate value for the adjacent axis (476). For example, if each file or record within raw performance data 108 (FIG. 1A) has a computed value along an X-axis of a two-dimensional graph, then each file or record of behavioral data 116 (FIG. 1A) is assigned a computed value along a Y-axis of the same two-dimensional graph. In other examples, raw performance data 108 (FIG. 1A) may be assigned a computed value along a Y-axis of a two-dimensional graph while other data may be used to compute values for an X-axis of the same two-dimensional graph. Further, in still other examples, X-axis values may not be computed and instead established by using, for example, a pre-established set of values determined from, for example, survey data 118 (FIG. 1A) such as that found in Item Response Theory (i.e., IRT)-based surveys. In yet other examples, coordinate values for the X and Y-axes may be determined differently and are not limited to the examples described above.

Here, once coordinate values are determined and coordinate sets are created and stored by performance data module 222 (FIG. 2) (or another module of application 202 (FIG. 2)), categorizations of validated raw performance data 108 (FIG. 1A)) are determined (478). Correlations are then determined, in some examples, between coordinate value sets for each individual file or record of raw performance data 108 (FIG. 1A). Subsequently, display module 218 (FIG. 2) may be configured to transfer data with performance data module 222 (FIG. 2) to generate a plot and "draw" a thermal line along the plotted coordinate values of validated raw performance data 108 (FIG. 1A) (480). In some examples, a thermal line may be used to statistically analyze raw performance data 108 (FIG. 1A) against attributes determined from behavioral data 116 (FIG. 1A) and, based on a comparison, determine which individual files or records within raw performance data 108 (FIG. 1A) are likely to be generated as output performance data from a model built by platform 102 (FIG. 1A) and application 202 (FIG. 2) (482).

In some examples, after validated raw performance data 108 (FIG. 1A) is compared to attributes determined from behavioral data 116 (FIG. 1A), any statistical differences are evaluated (484). Statistical differences, when evaluated, may be used to determine whether the effect of other data or context is present. For example, by using categorical data such as role or region, statistical differences may identify patterns, trends, or behavior associated with a given role or region. In other examples, by using categorical data, which may include coordinate values of previously plotted individual files or records of other validated raw performance data previously statistically analyzed, validated raw performance data 108 may be localized or categorized to determine whether individual files or records should be discarded or selected for output performance data 128 (FIG. 1A). Various techniques for selection of a model based on the evaluated output of statistically analyzing raw performance data 108 (FIG. 1A) may be suggested by the results of evaluation 484. Process 470 continues in FIG. 4E, as described in greater detail below.

Figure 4E:
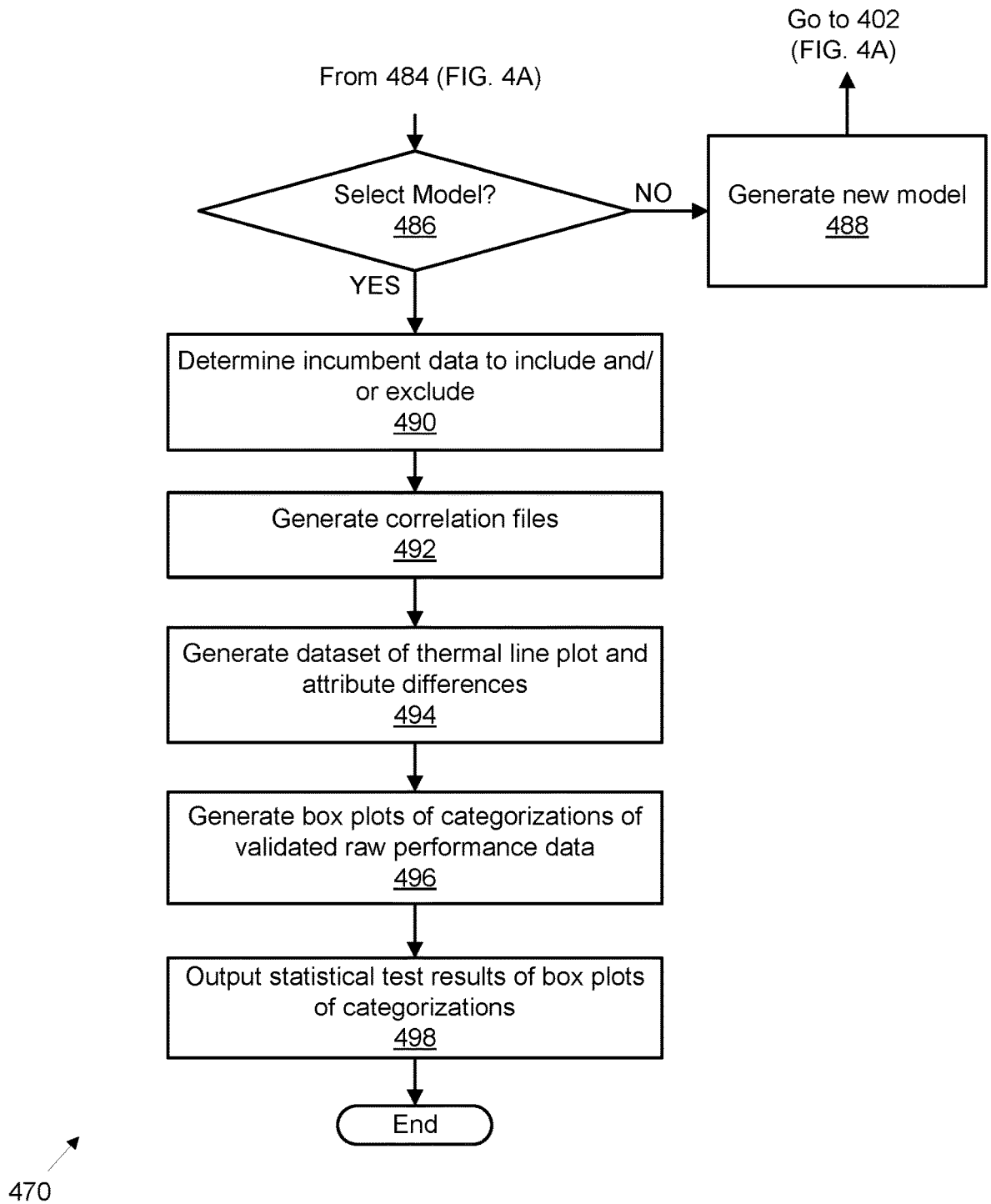
FIG. 4E illustrates a further exemplary process for building a training dataset for a machine and deep learning process model for performance and behavioral data.

FIG. 4E illustrates a further exemplary process for building a training dataset for a machine and deep learning process model for performance and behavioral data. Here, process 470 continues when a determination is made as to whether to select a given model built by platform 102 (FIG. 1A, 1B) and application 202 (FIG. 2) based on the results of evaluating statistical differences between validated performance data 108 (FIG. 1A) and behavioral data 116 (FIG. 1A), as described above (486). At this stage of process 470, selection of a given model for use in processing raw performance data 108 (FIG. 1A) has not been fully complete, which occurs after process 470 is completed and a given model has been tested against exit criteria configured to determine if a model built by platform 102 (FIG. 1A, 1B) and application 202 (FIG. 2) is selectable (i.e., found, based on the following statistical analysis, to meet exit criteria established for determining whether to deploy a given model). Prior to being evaluated against exit criteria, a model built by platform 102 (FIG. 1A) and application 202 (FIG. 2) may be identified as a "model candidate" and grouped or pooled with other model candidates in examples where multiple alternative, supplementary, or complementary models are built, as in the example of FIG. 5 described below.

Referring back to FIG. 4E, if a determination is made to not select a given model, then logic module 210 (FIG. 2) is invoked to generate modeling engine 212 (FIG. 2) to build another model (488). Alternatively, if a given model is selected, then a determination is made as to whether to include or exclude incumbent data 114 (FIG. 1A) (490). Next, correlation files are generated as output of the statistical analysis of training data 120 (FIG. 1A) (492). In some examples, correlation files may include data such as statistics of correlations found between plotted, validated raw performance data 108 (FIG. 1A) and attributes determined from behavioral data 116 (FIG. 1A). In other examples, correlation files may also include data representing the data-based results of evaluating statistical differences found between plotted, validated raw performance data 108 (FIG. 1A) and attributes determined from behavioral data 116 (FIG. 1A). As used herein, "attributes" may also refer to baseline attributes determined from output performance data 128 (FIG. 1A) from the processing of prior input raw performance data 108 using a previously-built and selected model.

Referring back to FIG. 4E, a dataset is generated that represents the statistical differences of a thermal line plot (or another statistical analysis technique may be used) of validated raw performance data 108 (FIG. 1A) against behavioral data 116 (FIG. 1A), including statistical differences evaluated between the validated raw performance data 108 and attributes determined from behavioral data 116 (FIG. 1A) (494). Further, box plots of categorizations of validated raw performance data 108 (FIG. 1A) may be performed (496). In some examples, "box plots" may refer to techniques used to identify groups of plotted, validated raw performance data 108 (FIG. 1A). After determining box plots to categorize plotted, validated raw performance data 108 (FIG. 1A), statistical analysis of the box plots is performed and the results therefrom are output (498). In other examples, process 470 and its disclosed subprocesses and data operations may be designed, implemented, ordered, or performed differently and are not limited to those shown and described.

Figure 5:
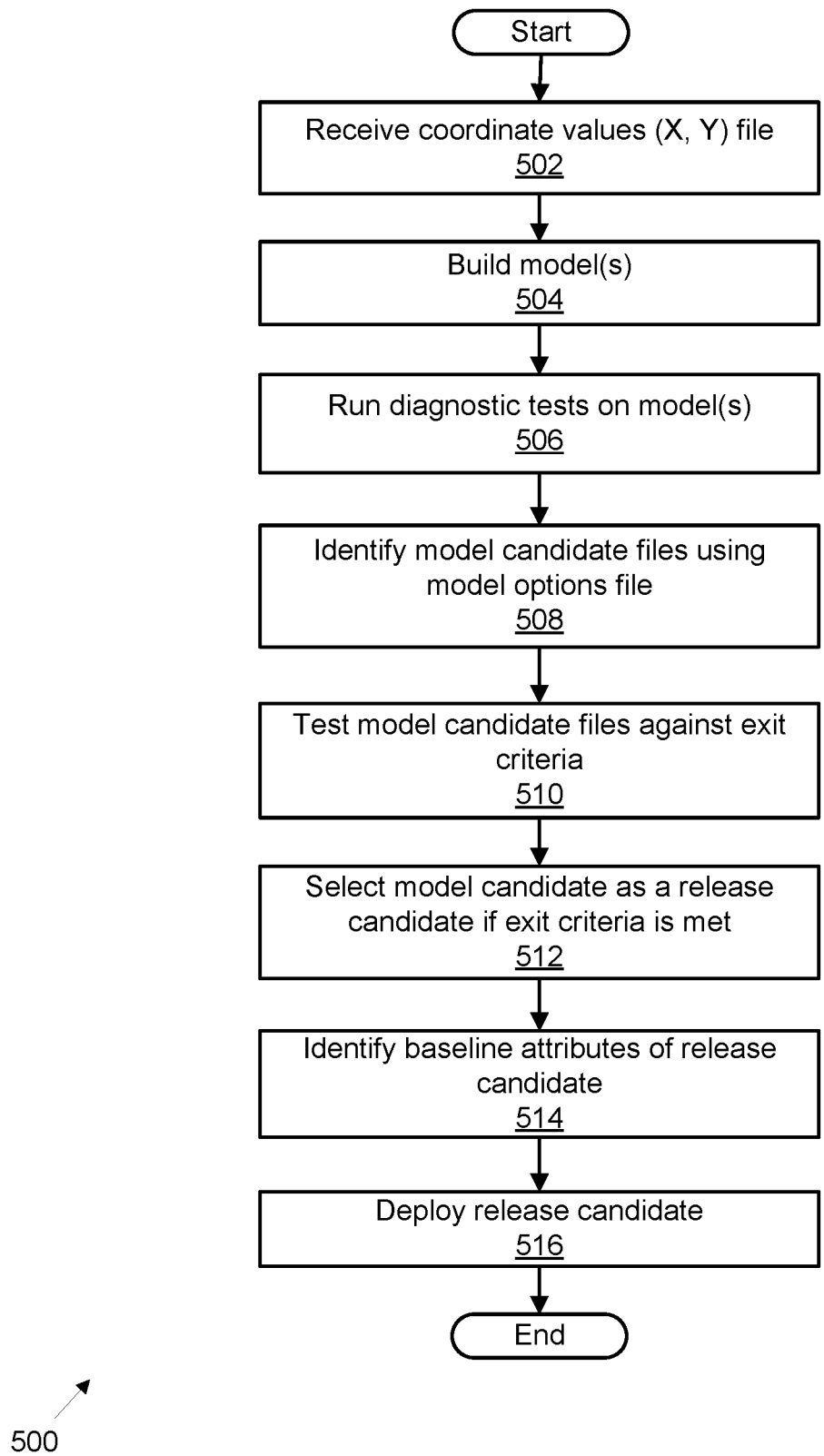
FIG. 5 illustrates an exemplary process for building multiple predictive models for machine and deep learning process modeling of performance and behavioral data.

FIG. 5 illustrates an exemplary process for building multiple predictive models for machine and deep learning process modeling of performance and behavioral data. Here, process 500 starts by receiving a file including coordinate values of plotted, validated raw performance data 108 (FIG. 1A) against attributes (i.e., behavioral attributes determined from evaluating (e.g., statistical analysis) behavioral data 116 (FIG. 1A)) (502). Using one or more files of coordinate values, models (i.e., model candidates) are built by platform 102 (FIG. 1A) and application 202 (FIG. 2)), as described above (504). In some examples, multiple models may be built using permutations of different techniques for determining for evaluating raw performance data 108 (FIG. 1A). For example, in addition to thermal line graphs (as described above), feature reduction or search methods (e.g., full logistic with stepwise Akaike information criterion (i.e., AIC or stepAIC), correlation coefficient techniques (e.g., Pearson, Spearman, or others), KPI analysis (statistical or otherwise), a gain ratio, or others, without limitation or restriction. KPIs, in some examples, may also be determined using various techniques such as Euclidean distance, zscores, log transformation, or other algorithms using, for example, average quota attainment over x periods, among others). Still other models may be built using algorithms such as logistic regression, support vector machine (SVM) machine learning algorithms, J48 decision tree, C4.5, and other deep or machine learning algorithms, without limitation or restriction. Assuming models are built and selected as model candidates, diagnostic tests may be performed on them to determine suitability for further evaluation against exit criteria (506). In some examples, diagnostic tests may be based on algorithms, processes, or techniques for internal and cross-validated accuracy, precision, and recall. Other diagnostic tests may be based on Chi-square comparisons of a model against a null model (i.e., a model built, but not run against raw performance data 108 (FIG. 1A)), McFadden's pseudo-R2 (for logistic regression), as well as evaluating the quantity and directionality of differentiators, as plotted. In other examples, diagnostic tests may be determined differently. When a model is built, as described herein, the techniques used by modeling engine 212 (FIG. 2) to construct a model may be stored as data or referenced data in model options 122 (FIG. 2).

For those model candidates that are determined to be suitable for further evaluation after diagnostic testing has been completed, identification of each model candidate occurs where variations for running each model are identified as data stored as model options 122 (FIG. 1A) and testing against exit criteria occurs (508). Subsequently, model candidates are then tested against exit criteria (510). For model candidates that meet testing requirements of exit criteria 126 (FIG. 1A), selection of a model candidate as a release candidate occurs (512). In some examples, a "release candidate" may refer to a model that is configured, tested, selected, and identified for deployment. Not all models built by platform 102 (FIG. 1A) and application 202 (FIG. 2) may be suitable or are desirable for deployment and the use of exit criteria is intended to ensure that results generated from the use of a given model meet particular requirements of accuracy, precision, recall, or other aspects. Selection and/or deployment of a release candidate may also include other quantitative and qualitative processes determined by applying various analytical techniques established using data science, computer science, behavioral science, or other.

After a release candidate has been selected, baseline attributes are determined and identified for further use by a release candidate (i.e., model) when evaluating raw performance data 108 (FIG. 1A) to generate output performance data 128 (FIG. 1A) (514). As described above, attributes used to graph validated raw performance data 108 (FIG. 1A) against attributes determined from behavioral data 116 (FIG. 1A) may also include those identified as baseline attributes from release candidates and the use thereof against raw performance data 108 to generate output performance data 128 (FIG. 1A). After identifying baseline attributes from a release candidate, deployment may occur (516). In some examples, deployment of a release candidate to a host site, server, or other computing location configured to host a model may include generating engineering input files (not shown) such as raw coordinate value files (e.g., raw X-coordinate value file, raw Y-coordinate value file, or files for other types of graphs or plots such as 3 dimensional or others), test input and output files for the model, or other documents that may provide parameters for operating a given model (e.g., a contract that may establish parameters by which a model may be run for a particular organization, or the like). Deployment may also include receiving the above-described files and data for use in deploying a release candidate in a production environment associated with platform 102 (FIG. 1A) and application 202 (FIG. 2), such as that provided by Aptology, Inc. of San Francisco, Calif. In other examples, a release candidate may be deployed directly to a host site that is not associated with or has data communication links with platform 102 (FIG. 1A) and application 202 (FIG. 2). In still other examples, a release candidate may be deployed from a production environment associated with platform 102 (FIG. 1A) and application 202 (FIG. 2) using one or more data communication links and networks to transfer executable files associated with the release candidate to the host site, server, computer, computing system, or the like. In other examples, process 500 and its disclosed subprocesses and data operations may be designed, implemented, ordered, or performed differently and are not limited to those shown and described.

Figure 6:
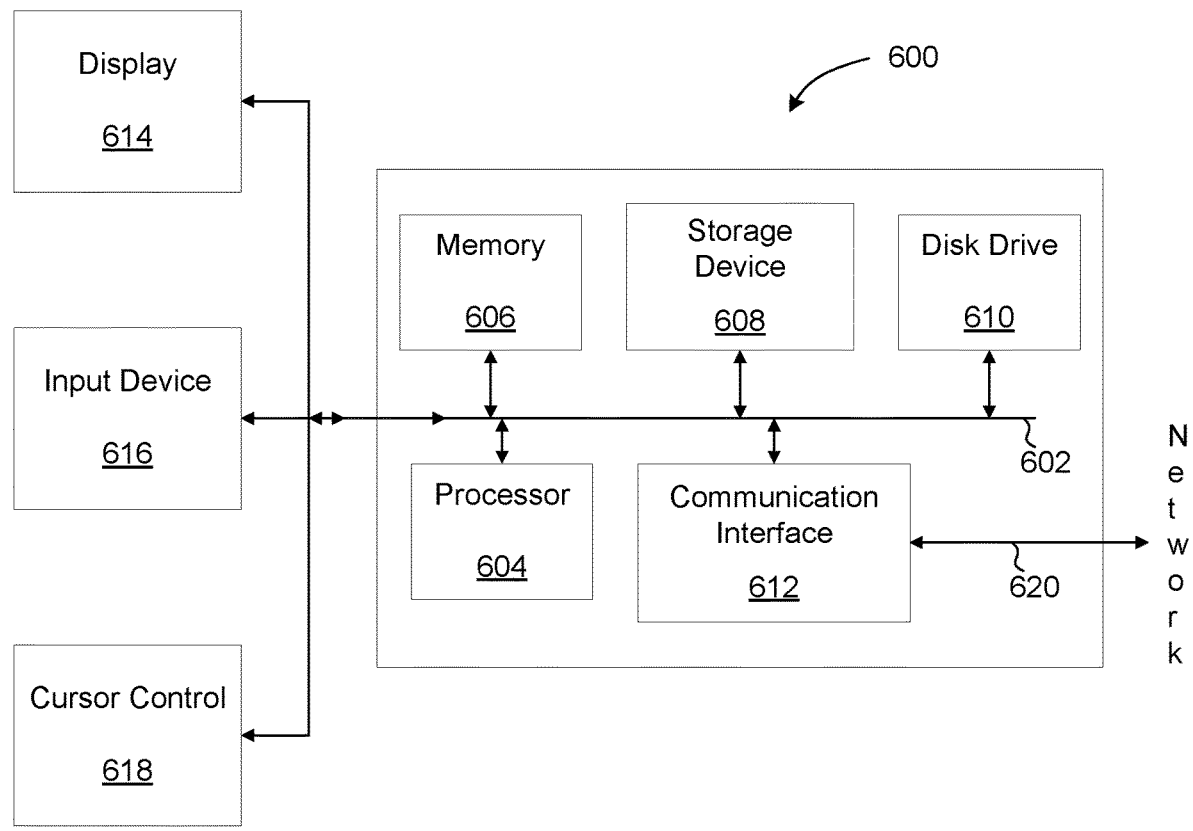
FIG. 6 illustrates an exemplary computing system suitable for machine and deep learning process modeling of performance and behavioral data.

FIG. 6 illustrates an exemplary computing system suitable for machine and deep learning process modeling of performance and behavioral data. In some examples, computer system 600 may be used to implement computer programs, applications, methods, processes, or other software to perform the above-described techniques. Computing system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), cursor control 618 (e.g., mouse or trackball), communication link 620, and network 622.

According to some examples, computing system 600 performs specific operations by processor 604 executing one or more sequences of one or more instructions stored in system memory 606. Such instructions may be read into system memory 606 from another computer readable medium, such as static storage device 608 or disk drive 610.

In some examples, hard-wired circuitry may be used in place of or in combination with software instructions for implementation.

The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks, such as disk drive 610. Volatile media includes dynamic memory, such as system memory 606.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by a single computer system 600. According to some examples, two or more computing system 600 coupled by communication link 620 (e.g., LAN, PSTN, or wireless network) may perform the sequence of instructions in coordination with one another. Computing system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   receiving at a platform input performance data comprising an induction document, and raw performance data, the raw performance data being processed using a customized performance data template, the raw performance data including one or more data records associated with a candidate for employment;
   validating a structure and context of the raw performance data by performing statistical analysis on the raw performance data using incumbent data and by determining whether an anomaly is present in the raw performance data, the incumbent data included in at least a portion one or more data records associated with an employee and associated with a pool of data external to the one or more data records associated with the candidate for employment;
   determining whether the incumbent data is sufficient to build a model;
   building a model using a modeling engine configured to generate an output performance dataset by determining one or more performance metrics and force ranking at least a part of the incumbent data;
   evaluating a behavioral dataset having one or more behavioral attributes determined from a survey and the output performance dataset, the one or more behavioral attributes associated with the one or more data records associated with the candidate for employment or the one or more data records associated with the employee;
   generating a training dataset for the model using the behavioral dataset, the incumbent data, and the output performance dataset; and
   identifying the model as a model candidate, the model candidate also being identified as a release candidate if, when evaluating the model candidate using one or more exit criteria, a diagnostic threshold is met or exceeded.

2. The method of claim 1, further comprising determining one or more key performance indicators based on data representing behavioral assessments derived from data representing the survey.

3. The method of claim 1, further comprising generating a customized performance data template.

4. The method of claim 1, wherein validating the structure and the context of the raw performance data file further comprises determining one or more records of the incumbent data to exclude from being used by the model.

5. The method of claim 1, wherein validating the structure and the context of the raw performance data file further comprises:
   determining if a structure associated with the induction document structure has changed;
   identifying a correct number of incumbents associated with the incumbent data;
   determining if a column within the customized performance data template is complete; and
   aligning a subfield associated with the induction document is aligned with another subfield associated with another induction document.

6. The method of claim 1, wherein building the training dataset for the model comprises matching the output performance dataset with the behavioral dataset.

7. The method of claim 1, wherein building the training dataset for the model comprises determining if one or more rows of the output performance dataset match one or more other rows of the behavioral dataset.

8. The method of claim 1, wherein using the model to identify one or more statistical differences further comprises evaluating categorical data associated with the output performance dataset and the behavioral dataset, the categorical data being configured to identify a role.

9. The method of claim 1, wherein using the model to identify one or more statistical differences further comprises evaluating categorical data associated with the output performance dataset and the behavioral dataset, the categorical data being configured to identify a region.

10. The method of claim 1, further comprising using the incumbent data to process the raw performance data file, the incumbent data being configured to identify one or more incumbents to be used by the model when generating the candidate file.

11. The method of claim 1, wherein evaluating the behavioral dataset having one or more behavioral attributes determined from a survey and the output performance dataset further comprises generating a coordinate value associated with a performance value and another coordinate value associated with a behavioral attribute, the coordinate value and the another coordinate value being configured to reference a file in the raw performance data.

12. The method of claim 1, wherein evaluating the behavioral dataset having one or more behavioral attributes determined from a survey and the output performance dataset further comprises using the model to determine a correlation between the coordinate value and the another coordinate value, the correlation being a thermal line configured to identify one or more differences between the behavioral attribute and another behavioral attribute, and to identify one or more statistical differences between one or more behavioral attributes in the raw performance data using categorical data.

13. A system, comprising:
a data storage repository configured to store a raw performance data file, incumbent data, an output performance dataset, a behavioral dataset; and
a networked computing platform including a logic module configured to receive at a platform input performance data, including an induction document, and raw performance data, the raw performance data being processed using a customized performance data template, the raw performance data including one or more data records associated with a candidate for employment, to validate a structure and context of the raw performance data by performing statistical analysis on the raw performance data using incumbent data and by determining whether an anomaly is present in the raw performance data, the incumbent data included in at least a portion one or more data records associated with an employee and associated with a pool of data external to the one or more data records associated with the candidate for employment, to determine whether the incumbent data is sufficient to build a model, to build a model to generate an output performance dataset configured to determine one or more performance metrics and to force rank at least a part of the incumbent data, to evaluate a behavioral dataset having one or more behavioral attributes determined from a survey and the output performance dataset, the one or more behavioral attributes associated with the one or more data records associated with the candidate for employment or the one or more data records associated with the employee, to generate a training dataset for the model using the behavioral dataset, the incumbent data, and the output performance dataset, to identify a candidate file using the model, the candidate file being identified as a release candidate and the model being identified as a model candidate, and to evaluate the model candidate against one or more other model candidates using one or more exit criteria to determine whether the model candidate, relative to the one or more other model candidates, is used by the platform to identify a release candidate.

14. The system of claim 13, further comprising building a plurality of models to process the behavioral dataset and the output performance dataset, each of the plurality of models being identified as another model candidate.

15. The system of claim 13, further comprising building a plurality of models to process the behavioral dataset and the output performance dataset using a feature reduction algorithm.

16. The system of claim 13, wherein receiving the induction document comprises parsing the induction document to identify one or more key performance indicators based on data representing behavioral assessments derived from data representing the survey.

17. The system of claim 13, further comprising displaying the release candidate using a release candidate model file transferred from the model and the platform to a display interface configured as a management dashboard, the release candidate model file being parsed to render one or more release candidate behavioral attributes on the management dashboard.

18. The system of claim 13, further comprising using the exit criteria, a release candidate model file, and a model options file to deploy the model to another system.

19. The system of claim 13, further comprising generating a combined data file configured to include one or more raw coordinate values configured to reference the raw performance file and the behavioral dataset, and to store other data associated with the output performance dataset from the model after being deployed to another system.

20. A non-transitory computer readable medium having one or more computer program instructions configured to perform a method, the method comprising:
receiving at a platform input performance data, including an induction document, and raw performance data, the raw performance data being processed using a customized performance data template, the raw performance data including one or more data records associated with a candidate for employment;
validating a structure and context of the raw performance data by performing statistical analysis on the raw performance data using incumbent data and by determining whether an anomaly is present in the raw performance data, the incumbent data included in at least a portion one or more data records associated with an employee and associated with a pool of data external to the one or more data records associated with the candidate for employment;
determining whether the incumbent data is sufficient to build a model;
building a model to generate an output performance dataset configured to determine one or more performance metrics and to force rank at least a part of the incumbent data;
evaluating a behavioral dataset having one or more behavioral attributes determined from a survey and the output performance dataset;
generating a training dataset for the model using the behavioral dataset, the incumbent data, and the output performance dataset;
identifying a candidate file using the model, the candidate file being identified as a release candidate and the model being identified as a model candidate;
evaluating the model candidate against one or more other model candidates using one or more exit criteria to determine whether the model candidate, relative to the one or more other model candidates, is used by the platform to identify a release candidate, the one or more behavioral attributes associated with the one or more data records associated with the candidate for employment or the one or more data records associated with the employee; and
determining one or more key performance indicators based on data representing behavioral assessments derived from data representing the survey.

* * * * *